US012591901B2

(12) United States Patent
  Garel et al.

(10) Patent No.: US 12,591,901 B2
(45) Date of Patent: **\*Mar. 31, 2026**

(54) METHODS FOR PERSONALIZED MARKETING OF RETAIL PRODUCTS

(71) Applicant: Alpha Modus, Corp., Cornelius, NC (US)

(72) Inventors: Michael Garel, Austin, TX (US); Jim Wang, Austin, TX (US)

(73) Assignee: Alpha Modus, Corp., Cornelius, NC (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/233,507

(22) Filed: Jun. 10, 2025

(65) Prior Publication Data

US 2025/0299210 A1     Sep. 25, 2025

Related U.S. Application Data

(63) Continuation of application No. 18/905,975, filed on Oct. 3, 2024, now Pat. No. 12,423,718, which is a
(Continued)

(51) Int. Cl.
  *G06Q 30/0201*     (2023.01)
  *G06Q 30/0207*     (2023.01)
  *G06Q 30/0251*     (2023.01)

(52) U.S. Cl.
  CPC ..... *G06Q 30/0201* (2013.01); *G06Q 30/0224* (2013.01); *G06Q 30/0269* (2013.01)

(58) Field of Classification Search
  None
  See application file for complete search history.

(56) References Cited

U.S. PATENT DOCUMENTS

| | | | |
|---|---|---|---|
| 5,392,066 A | 2/1995 | Fisher et al. | |
| 5,757,924 A | 5/1998 | Friedman et al. | |

(Continued)

FOREIGN PATENT DOCUMENTS

| | | | |
|---|---|---|---|
| WO | 2001048661 A2 | 7/2001 | |
| WO | 2001067332 A1 | 9/2001 | |

(Continued)

OTHER PUBLICATIONS

Jie Zhang "Customizing Promotions in Online Stores", Nov. 2004, https://doi.org/10.1287/mksc.1040.0055, p. 1 (Year: 2004).\*

(Continued)

*Primary Examiner* — Romain Jeanty
(74) *Attorney, Agent, or Firm* — Dickinson Wright PLLC; Ross Spencer Garsson

(57)           ABSTRACT

Method for personalized marketing of retail products. Generally, the method includes obtaining an information analysis about the shopping activities of the person, in which the information analysis is an analysis of gathered information by one or more first information monitoring devices about shopping activities of the person and the gathered information includes gathered product interaction information of the person. The gathered product interaction information includes product interaction information gathered by at least one of the one or more first information monitoring devices, and the product interaction information is based upon shopping by the person of one or more first products. The method further includes tracking the person using one or more second information monitoring devices to determine the location of the person at a retail store that sells a product that relates to the one or more first product, and, based upon the person being determined to be at the retail store, providing the person a communication. The communication includes a product communication that is directed to the person based (Continued)

upon the information analysis, the product communication regards a purchase option for the product, and the purchase option includes an option to purchase the product at a reduced price during a limited period of time.

20 Claims, 14 Drawing Sheets

Related U.S. Application Data continuation of application No. 18/651,410, filed on Apr. 30, 2024, now Pat. No. 12,354,121, which is a continuation of application No. 18/519,550, filed on Nov. 27, 2023, now Pat. No. 12,175,484, which is a continuation of application No. 18/100,377, filed on Jan. 23, 2023, now Pat. No. 12,026,731, which is a continuation of application No. 17/590,605, filed on Feb. 1, 2022, now Pat. No. 12,039,550, which is a continuation of application No. 16/837,645, filed on Apr. 1, 2020, now Pat. No. 11,301,880, which is a continuation of application No. 16/509,343, filed on Jul. 11, 2019, now Pat. No. 10,853,825, which is a continuation of application No. 14/335,429, filed on Jul. 18, 2014, now Pat. No. 10,360,571.

(60) Provisional application No. 61/856,525, filed on Jul. 19, 2013.

(56) References Cited

U.S. PATENT DOCUMENTS

| | | | |
|---|---|---|---|
| 5,966,696 A | | 10/1999 | Giraud |
| 5,974,396 A * | | 10/1999 | Anderson .......... G06Q 30/0204 |
| | | | 705/14.27 |
| 6,230,143 B1 * | | 5/2001 | Simons .............. G06Q 30/0238 |
| | | | 705/14.39 |
| 6,334,110 B1 | | 12/2001 | Walter et al. |
| 6,839,681 B1 | | 1/2005 | Hotz |
| 6,925,441 B1 | | 8/2005 | Jones, III et al. |
| 7,054,830 B1 | | 5/2006 | Eggleston et al. |
| 7,158,943 B2 | | 1/2007 | van der Riet |
| 7,174,304 B1 * | | 2/2007 | Boardman .......... G06Q 30/0205 |
| | | | 705/7.34 |
| 7,463,143 B2 | | 12/2008 | Forr et al. |
| 7,680,685 B2 | | 3/2010 | Oiumet et al. |
| 7,822,692 B2 | | 10/2010 | Zuerl et al. |
| 7,873,543 B2 | | 1/2011 | Perrier et al. |
| 7,996,256 B1 | | 8/2011 | Anand et al. |
| 8,009,863 B1 | | 8/2011 | Sharma et al. |
| 8,032,425 B2 | | 10/2011 | Yi |
| 8,035,511 B2 | | 10/2011 | Weaver et al. |
| 8,051,015 B2 | | 11/2011 | Veit et al. |
| 8,135,606 B2 | | 3/2012 | Dupree |
| 8,204,779 B1 | | 6/2012 | Hughes et al. |
| 8,208,014 B2 | | 6/2012 | Geiger et al. |
| 8,219,438 B1 | | 7/2012 | Moon et al. |
| 8,219,444 B2 | | 7/2012 | Zuerl et al. |
| 8,321,303 B1 | | 11/2012 | Krishnamurthy et al. |
| 8,489,110 B2 | | 7/2013 | Frank et al. |
| 8,983,488 B2 | | 3/2015 | Sweeney et al. |
| 9,299,077 B2 | | 3/2016 | Brubaker |
| 10,176,456 B2 | | 1/2019 | Puerini et al. |
| 10,268,983 B2 | | 4/2019 | Kumar et al. |
| 10,360,571 B2 | | 7/2019 | Garel et al. |
| 10,360,593 B2 | | 7/2019 | Hunter et al. |
| 10,853,825 B2 | | 12/2020 | Garel et al. |
| 10,977,672 B2 | | 4/2021 | Garel et al. |
| 11,042,890 B2 | | 6/2021 | Garel et al. |
| 11,049,120 B2 | | 6/2021 | Garel et al. |
| 11,301,880 B2 | | 4/2022 | Garel et al. |
| 12,026,731 B2 | | 7/2024 | Garel et al. |
| 12,039,550 B2 | | 7/2024 | Garel et al. |
| 12,175,484 B2 | | 12/2024 | Garel et al. |
| 12,354,121 B2 | | 7/2025 | Garel et al. |
| 2001/0014868 A1 | | 8/2001 | Herz et al. |
| 2001/0032123 A1 | | 10/2001 | Burns et al. |
| 2001/0044751 A1 | | 11/2001 | Pugliese, III et al. |
| 2002/0065715 A1 * | | 5/2002 | Tennyson .......... G06Q 30/0274 |
| | | | 705/26.1 |
| 2002/0102993 A1 | | 8/2002 | Hendrey et al. |
| 2002/0147631 A1 | | 10/2002 | Smith et al. |
| 2002/0165790 A1 * | | 11/2002 | Bancroft .............. G05D 1/0088 |
| | | | 705/28 |
| 2003/0018535 A1 * | | 1/2003 | Eisenberg .............. G06Q 30/02 |
| | | | 705/26.41 |
| 2004/0002912 A1 * | | 1/2004 | Colon .................... G06Q 30/02 |
| | | | 705/37 |
| 2004/0254837 A1 | | 12/2004 | Roshkoff |
| 2005/0234774 A1 | | 10/2005 | Dupree |
| 2005/0251408 A1 * | | 11/2005 | Swaminathan .... G06Q 30/0269 |
| | | | 705/14.1 |
| 2005/0273376 A1 | | 12/2005 | Ouimet et al. |
| 2005/0273384 A1 * | | 12/2005 | Fraser ................ G06Q 30/0242 |
| | | | 705/14.41 |
| 2006/0010028 A1 | | 1/2006 | Sorensen |
| 2006/0010030 A1 | | 1/2006 | Sorensen |
| 2006/0015404 A1 | | 1/2006 | Tran |
| 2006/0064339 A1 | | 3/2006 | Allred |
| 2006/0242011 A1 | | 10/2006 | Bell et al. |
| 2006/0259360 A1 | | 11/2006 | Flinn et al. |
| 2006/0293948 A1 | | 12/2006 | Weinblatt |
| 2007/0065206 A1 | | 3/2007 | Silverbrook et al. |
| 2007/0100680 A1 | | 5/2007 | Kumar et al. |
| 2007/0124216 A1 | | 5/2007 | Lucas |
| 2007/0174115 A1 * | | 7/2007 | Chieu ................ G06Q 30/0236 |
| | | | 705/14.27 |
| 2007/0192183 A1 * | | 8/2007 | Monaco ............. G06Q 30/0226 |
| | | | 705/14.27 |
| 2007/0282669 A1 | | 12/2007 | Bachman et al. |
| 2008/0021767 A1 | | 1/2008 | Benson et al. |
| 2008/0040219 A1 | | 2/2008 | Kim et al. |
| 2008/0059282 A1 | | 3/2008 | Vallier et al. |
| 2008/0109397 A1 | | 5/2008 | Sharma et al. |
| 2008/0245862 A1 | | 10/2008 | Dennard et al. |
| 2008/0249868 A1 * | | 10/2008 | Angell ................ G06Q 30/0271 |
| | | | 705/14.67 |
| 2008/0256462 A1 | | 10/2008 | Chao et al. |
| 2008/0294996 A1 | | 11/2008 | Hunt et al. |
| 2009/0048917 A1 | | 2/2009 | Blake et al. |
| 2009/0150920 A1 | | 6/2009 | Jones |
| 2009/0187492 A1 | | 7/2009 | Hammad et al. |
| 2009/0259518 A1 | | 10/2009 | Harvey et al. |
| 2009/0307003 A1 | | 12/2009 | Benyamin et al. |
| 2010/0205045 A1 | | 8/2010 | Zhang et al. |
| 2010/0211431 A1 | | 8/2010 | Lutnick et al. |
| 2010/0262487 A1 | | 10/2010 | Edwards et al. |
| 2011/0119122 A1 | | 5/2011 | Padam et al. |
| 2011/0173071 A1 | | 7/2011 | Meyer et al. |
| 2011/0173102 A1 | | 7/2011 | Burns et al. |
| 2011/0196724 A1 | | 8/2011 | Fenton et al. |
| 2011/0248818 A1 | | 10/2011 | Hashim-Waris |
| 2011/0258049 A1 | | 10/2011 | Ramer et al. |
| 2011/0264499 A1 | | 10/2011 | Abendroth et al. |
| 2011/0264502 A1 | | 10/2011 | Taylor et al. |
| 2012/0016733 A1 | | 1/2012 | Belvin et al. |
| 2012/0089488 A1 | | 4/2012 | Letchford |
| 2012/0095805 A1 * | | 4/2012 | Ghosh ................ G06Q 30/0201 |
| | | | 705/7.29 |
| 2012/0158516 A1 | | 6/2012 | Wooten, III et al. |
| 2012/0203572 A1 | | 8/2012 | Christensen |
| 2012/0209725 A1 | | 8/2012 | Bellinger |
| 2012/0226586 A1 | | 9/2012 | Paul |
| 2012/0245974 A1 | | 9/2012 | Bonner et al. |
| 2012/0295593 A1 | | 11/2012 | Duenas et al. |
| 2012/0330716 A1 | | 12/2012 | Volpe et al. |
| 2013/0018746 A1 | | 1/2013 | Winslade et al. |
| 2013/0151381 A1 | | 6/2013 | Klein |
| 2013/0218637 A1 | | 8/2013 | Bikman et al. |
| 2013/0297422 A1 | | 11/2013 | Hunter et al. |

(56) References Cited

U.S. PATENT DOCUMENTS

| | | |
|---|---|---|
| 2013/0325653 A1* | 12/2013 | Ouimet .................... G06F 7/08 |
| | | 705/26.7 |
| 2013/0332291 A1 | 12/2013 | Perez |
| 2014/0006129 A1 | 1/2014 | Heath |
| 2014/0143016 A1 | 5/2014 | Walker |
| 2014/0207614 A1 | 7/2014 | Ramaswamy et al. |
| 2014/0249887 A1 | 9/2014 | Parkkinen et al. |
| 2014/0279294 A1 | 9/2014 | Field-Darragh et al. |
| 2014/0324563 A1 | 10/2014 | Wencel |
| 2015/0025936 A1 | 1/2015 | Garel et al. |
| 2016/0162912 A1 | 6/2016 | Garel et al. |
| 2019/0333081 A1 | 10/2019 | Garel et al. |
| 2020/0226621 A1 | 7/2020 | Garel et al. |
| 2020/0226622 A1 | 7/2020 | Garel et al. |
| 2020/0226623 A1 | 7/2020 | Garel et al. |
| 2020/0364730 A1 | 11/2020 | Garel et al. |
| 2022/0156764 A1 | 5/2022 | Garel et al. |
| 2023/0162211 A1 | 5/2023 | Garel et al. |
| 2024/0095760 A1 | 3/2024 | Garel et al. |
| 2024/0281829 A1 | 8/2024 | Garel et al. |
| 2025/0029124 A1 | 1/2025 | Garel et al. |

FOREIGN PATENT DOCUMENTS

| | | | | |
|---|---|---|---|---|
| WO | WO-02091252 A2 * | 11/2002 | ............. | G06Q 30/02 |
| WO | 2004090760 A1 | 10/2004 | | |
| WO | 2005020126 A1 | 3/2005 | | |
| WO | 2005070032 A2 | 8/2005 | | |
| WO | 2005122041 A2 | 12/2005 | | |
| WO | 2007025384 A1 | 3/2007 | | |
| WO | 2007041597 A2 | 4/2007 | | |
| WO | 2007051273 A2 | 5/2007 | | |
| WO | 2007078033 A1 | 7/2007 | | |
| WO | 2007134306 A2 | 11/2007 | | |
| WO | 2011028429 A1 | 3/2011 | | |

OTHER PUBLICATIONS

Kenton "User Centred Opportunities for Supporting Consumer Behaviour Through Handheld and Ubiquitous Computing", Dec. 2002, IEEE, pp. 1-9 (Year: 2002).*

Ahuja, M., et al. "An Empirical Investigation of Online Consumer Purchasing Behavior", Dec. 2003, Communication of the ACM, pp. 145-151 (Year: 2003); 8 pages.

Chamorro-Koc, M. et al. "Human experience and product usability: Principles to assist the design of user-product interactions", Dec. 2009, Applied Ergonomics 40 (2009) 648-656 (Year: 2009); 9 pages.

Kim, D., et al. "Effects of Consumer Lifestyles on Purchasing Behavior on the Internet: A Conceptual Framework and Empirical Validation", Dec. 2000, International Conference on Information Systems (ICIS), pp. 687-695 (ICIS) (Year: 2000); 9 pages.

Koegel, K. "What Marketers Need to Know About Mobile Coupons", May 2011, Ad Age Insights, pp. 1-27 (Year: 2011); 28 pages.

Yan-Kwang et al "Product image allocation and inventory control of online stores", Dec. 2014, Scholarly Journals, pp. 1-17 (Year:2014); 17 pages.

Yannopoulos, P. "Impact of the Internet on Marketing Strategy Formulation", Oct. 2011, International Journal of Business and Social Science, vol. 2 No. 18, pp. 1-7 (Year: 2011); 7 pages.

International Search Report and Written Opinion; PCT/US14/47294; Mar. 27, 2015; 16 pages.

* cited by examiner

|  | Tool Company 2 | Tool Company 1 |
|---|---|---|
| Battery-Type | Ni-Cad | Ni-Cad |
| Battery charge type (min.) | 60 | 60 |
| CSA Listed | Yes | No |
| Clutch Setting | 17 | 24 position clutch |
| Manufacturer Warranty | 90 Day Money Back Guarantee 1 year Free Service Contract 3 year Limited Warranty | 3 year warranty |
| Maximum speed (rpm) | 1500 | 1600 |
| Product Weight (lb.) | 10 | 7.8 |
| Returnable | 90-Day | 90-Day |
| UL Listed | N-No UL Code Rating | 1-UL Listed |
| Voltage (volts) | 18 V | 18 V |
| Rating | ★★★★ | ★★★ |
| Price | $99.00 | $79.00 |

*FIG. 5B*

METHODS FOR PERSONALIZED MARKETING OF RETAIL PRODUCTS

CROSS-REFERENCE TO RELATED PATENT APPLICATIONS

This application is a continuation of U.S. patent application Ser. No. 18/905,975, filed Oct. 3, 2024, entitled "Methods and Systems For Providing Customer Assistance In A Retail Store," which is a continuation of U.S. patent application Ser. No. 18/651,410, filed Apr. 30, 2024, entitled "Methods and Systems for Shopping In A Retail Store," which is a continuation of U.S. patent application Ser. No. 18/519,550, filed Nov. 27, 2023, entitled "Method For Personalized Marketing And Advertising," which is a continuation of U.S. patent application Ser. No. 18/100,377, filed Jan. 23, 2023, entitled "Method For Personalized Marketing And Advertising Of Retail Products," which is a continuation of U.S. patent application Ser. No. 17/590,605, filed Feb. 1, 2022, entitled "Method For Enhancing Customer Shopping Experience In A Retail Store," which is a continuation of U.S. patent application Ser. No. 16/837,645, filed Apr. 1, 2020, entitled "Method And System For Inventory Management In A Retail Store," (which issued as U.S. Pat. No. 11,301,880 on Apr. 12, 2022), which is a continuation of U.S. patent application Ser. No. 16/509,343, filed Jul. 11, 2019, entitled "Method For Monitoring And Analyzing Behavior And Uses Thereof." (which issued as U.S. Pat. No. 10,853,825, on Dec. 1, 2020), which is a continuation of U.S. patent application Ser. No. 14/335,429, filed on Jul. 18, 2014, entitled "Method For Monitoring And Analyzing Behavior And Uses Thereof." (which issued as U.S. Pat. No. 10,360,571, on Jul. 23, 2019) and claims priority to provisional U.S. Patent Application Ser. No. 61/856,525, filed on Jul. 19, 2013, entitled "System For Monitoring And Analyzing Consumer Purchasing Behavior In Real-Time To Drive Sales Via Engaging Digital Customer Experiences." These patent applications are commonly assigned to the Assignee of the present invention and is are hereby incorporated herein (including Appendix A of the provisional patent application) by reference in their entirety for all purposes.

TECHNICAL FIELD

This disclosure relates to monitoring and analyzing behavior in various applications. Generally, this disclosure relates to systems (and uses thereof) for monitoring and analyzing consumer purchasing behavior in real-time to drive sales via engaging digital customer experiences.

BACKGROUND

The retail industry is a highly competitive industry. Attracting and maintaining repeat customers is one of the industry's biggest challenges. Today, consumers shop in a multichannel environment, meaning they switch fluidly between brick-and-mortar, and online retail outlets. The increased use of the internet and social media provides retail customers with a greater amount of information to make purchasing decisions. Brick-and-mortar retailers are challenged with providing the consumer with a richer experience than they can obtain online, in order to increase in-store sales, and stay in business. Delivering the right message to the right time to a customer that influences purchasing is one of brick-and-mortar retail's biggest impediments.

Currently, the greatest fear in brick-and-mortar retail is showrooming. Showrooming is defined as when a shopper visits a brick-and-mortar store to check out a product, but then either heads home or uses a mobile device in-store to make the purchase from an online retail establishment. It is estimated that over 47% of consumers showroom today, with that number increasing exponentially each year. Many retailers are closing stores due to this phenomenon. Though brick-and-mortar retail still accounts for approximately 90% of all retail purchases, online retail as a percentage of total retail is growing at over 10% annually. This places incredible stress on physical retail as they need to bring in more sales at a larger margin than online retailers to compensate for their large overheads.

In order to combat this continued online retail growth, brick-and-mortar retailers need to provide the right message to the right customer at the right time, an issue they continue to struggle with. Today's shopper expects the information they are provided in-store to be relevant to their needs. Online retail has the ability to use data driven practices to provide optimized messaging to their customers that will influence their purchasing. Brick-and-mortar retailers do not have this ability today. In fact, most consumers believe that associates within brick-and-mortar retail do not have enough product knowledge to provide sufficient assistance with their purchasing decisions. Over 70% of consumers make purchasing decisions after reading trusted third party reviews-which are not available in-store today, except through using a mobile device, which typically brings that customer to a competitor's site. Out of those who use their mobile device while shopping in physical retail, over 60% are initially using the device to gain more information, however, a competitors site will usually provide a better price or a better deal to that customer as well, leading them to purchase online and leave the retail store.

Today's toolbox for brick-and-mortar retailers and brands to understand consumer purchasing behavior is Point-of-Sale (POS) data. POS data is used to determine not only the stores revenue, but also overall consumer traffic, advertising effectiveness, inventory forecasting, and proper product mix. A challenge the retail industry currently faces is the lack of consumer purchasing data prior to the sale. At present, the only methods in use to determine consumer behavior prior to POS are focus groups, traffic counting devices, surveys, feedback from employees, and shopper shadows. None of these methods provides the retailer with a fraction of the information that could be used to determine effectiveness of store layout, inventory management, merchandising, at-shelf promotion, sales team positioning, and product feedback to the manufacturer/merchandizer.

Additionally, retailers are faced with the challenge of having the right inventory on the shelf at the precise time the consumer wants to make their purchase. Today's forecasting methods rely on historical and POS data. With the only data available to the retailer being after-the-fact, they lack a portion of important data required to improve the effectiveness of their forecasting and inventory models. Finally, retailers are interested in methods to influence and accelerate the consumer buying cycle. While online retailers continue to improve personalized shopping experiences by presenting offerings based on previous purchases or pre-set preferences, traditional advertising and merchandising methods do not effectively personalize marketing and promotional material toward a specific consumer to directly influence their purchasing decision.

SUMMARY OF INVENTION

This disclosure describes systems for monitoring and analyzing behavior in various applications and uses thereof.

Generally, this disclosure describes systems (and uses thereof) for monitoring and analyzing consumer purchasing behavior in real-time to drive sales via engaging, personalized, and targeted digital customer experiences.

The disclosed system includes a retail store system that features and can include MAC address tracking, user eye tracking, object identification of goods on shelves, APIs, and an advertising broker rules engine. In addition, the system can include customer engagement with interactive output displays that include displays with demographic and facial expression intelligence, displays with demographics and MAC-panels throughout store at product, displays with demographics and MAC-single panel or few panels scattered throughout store, automated customer assistance at shelf, customer purchase at shelf. Further, the system can include a customer engagement with reviews summary, a virtual loyalty program, and a relevance rating engine. And, the system can include analytic software that features and includes traffic counting, demographic intelligence, client side content management and presentation system, business intelligence reporting tied to the enumerated services and features. Further, the system generally includes one or more (and typically most) of cloud services, computing devices, user input and output devices, POS devices, local servers, cameras and sensors, WIFI devices, in-store customer devices, and output devices. Additionally, the system generally includes a system for communicating to user devices, such as cell phones. Further, the system generally includes networking between all of the above, between the above and cloud based services, and between the above and user devices. The system further can also include standalone customer kiosks.

The system of the present invention is capable of classifying and responding to individuals in a public place based on those classifications, as well as to capture the demographical and behavioral characteristics of those individuals for the purposes of improving services delivered to them. Retail application of the present system is only one possible use. The system can also be used for studying and analyzing audiences and management in other venues (such as movie theaters and sporting venues, city streets, pedestrian byways, shopping malls). By combining demographics with other electronic means of characteristic and behavior observation (such as WIFI monitoring of smart phones and other mobile devices), information (including unique information) can be gathered and analyzed, including at real-time.

In general, in one aspect, the invention features a system for monitoring and analyzing behavior of persons at a location. The system includes a server, one or more information monitoring devices (operatively connected to the server), one or more databases (operatively connected to (i) the server, (ii) at least one of the one or more information monitoring devices, or (iii) both); and a plurality of modules implemented by the server. The plurality of modules are selected from the group consisting of demographic intelligence modules, traffic modules, object identification modules, engagement modules, review summary modules, client side content management and presentation system modules, virtual loyalty program modules, automated customer assistance at shelf modules, purchase at shelf modules, reporting modules, API modules, advertising broker rules engine modules, relevance rating modules, and combinations thereof. At least one of the modules in the plurality of modules is a demographic intelligence module. At least one of the modules in the plurality of modules is a tracking module. The system is operable to analyze information gathered by the information monitoring devices using the plurality of modules.

Implementations of the invention can include one or more of the following features:

The system can be operable to analyze information gathered by the information monitoring devices in real-time using the plurality of modules.

The server can include a server located at the location operatively connected to cloud services.

The tracking module can be able to track the person within a predetermined area. The system can be able to link the information from the person gathered in the demographic intelligence module and the tracking module. The system can be operable to analyze the linked information of the person in real-time.

The tracking module can include a MAC address tracking module.

The one or more information monitoring devices can include at least three receivers located in or by the location for receiving information about the location of the person at a given time. Each of the at least three receivers can be able to determine a distance between the person and the receiver at the given time. The system can use the distances between the person and the at least three receivers to track the person as the person moves about the location.

The system can further include one or more displays operatively connected with the server. The one or more displays can be capable of engaging persons at the location based upon the information gathered by the one or more information monitoring devices.

The location can be a retail store.

The system can be operable for analyzing behavior of customers in the retail store in real-time.

The system can further include one or more displays operatively connected with the server. The one or more displays can be capable of engaging the customers based upon the information gathered by the one or more information monitoring devices.

The displays can be interactive displays. The interactive displays can be information monitoring devices.

The system can be operable to determine what product within the retail store the customer is viewing.

The one or more displays can be operable to provide information to the customer based upon the information gathered by the one or more information monitoring devices.

The system can include a MAC address tracking module.

The system can be able to recognize repeat customers of the retail store.

The system can include a reporting module. The system can be operable for generating a report based upon the analyzed behavior of the customers.

The system can include a loyalty program module for a loyalty program for the retail store. The system can be operable to register the customer to the loyalty program. The registration can include information of the customer that can be used to analyze behavior.

The s system can be operable for analyzing the customer behaviors for comparative product analysis.

The system can be operable for sending a communication to an employee of the retail store to signal the employee to interact with the customer based upon the analyzed behavior of the customer.

The communication can include an identification of a product being sought by the customer and materials about such product.

The system can be operable to provide marketing and advertising messages to the customer based upon the information gathered by the one or more information monitoring devices.

The system can include a relevant rating engine module. The one or more information monitoring devices can be operable to interact with the customer to gather information of the customer's age and gender by interactive questioning.

The information monitoring devices can be selected from the group consisting of computing devices, user input and output devices, displays, POS devices, cameras, sensors; WIFI devices; in-store customer devices; output devices; system for communicating to user devices, and kiosks.

The system can further include a coupon printer. The coupon printer can print out a coupon for a customer based upon the information gathered by the one or more information monitoring devices.

In general, in another aspect, the invention features a method using one or more information monitoring devices to gather information about a person in proximity of at least one of the one or more information monitoring device. The one or more information monitoring device is operably connected to (A) a server, (B) one or more databases, or (C) both. A plurality of modules are implemented by the server. The plurality of modules are selected from the group consisting of demographic intelligence modules, traffic modules, object identification modules, engagement modules, review summary modules, client side content management and presentation system modules, virtual loyalty program modules, automated customer assistance at shelf modules, purchase at shelf modules, reporting modules, API modules, advertising broker rules engine modules, relevance rating modules, and combinations thereof. At least one of the modules in the plurality of modules is a demographic intelligence module. At least one of the modules in the plurality of modules is a tracking module. The method further includes analyzing the information gathered by the information monitoring devices using the plurality of modules.

Implementations of the invention can include one or more of the following features:

The step of analyzing can include analyzing the information gathered by the information monitoring devices in real-time using the plurality of modules.

The server can include a server located at the location operatively connected to cloud services.

The step of gathering can include using the tracking module to track the person within a predetermined area. The step of analyzing can include linking the information from the person gathered in the demographic intelligence module and the tracking module. The step of analyzing can include analyzing the information gathered by the information monitoring devices in real-time using the plurality of modules.

The tracking module can include a MAC address tracking module.

The one or more information monitoring devices can include at least three receivers located in or by the location for receiving information about the location of the person at a given time. The step of gathering can include using the at least three receivers to determine a distance between the person and the receiver at the given time. The step of analyzing can include using the distances between the person and the at least three receivers to track the person as the person moves about the location.

The method can further include one or more displays operatively connected with the server. The one or more displays can engage persons at the location based upon the information gathered by the one or more information monitoring devices.

The location can be a retail store.

The step of analyzing can include analyzing behavior of customers in the retail store in real-time.

The method can further include one or more displays operatively connected with the server. The one or more displays can engage the customers based upon the information gathered by the one or more information monitoring devices.

The displays can be interactive displays. The interactive displays can be information monitoring devices.

The step of analyzing can include determining what product within the retail store the customer is viewing.

The one or more displays can provide information to the customer based upon the information gathered by the one or more information monitoring devices.

The plurality of modules implemented by the server can include a MAC address tracking module.

The step of analyzing can recognize repeat customers of the retail store.

The plurality of modules implemented by the server can include a reporting module. The method can further include generating a report based upon the analyzed behavior of the customers.

The plurality of modules implemented by the server can include a loyalty program module for a loyalty program for the retail store. The method can further include registering the customer to the loyalty program, wherein the registration includes information of the customer that can be used to analyze behavior.

The step of analyzing can include analyzing the customer behaviors for comparative product analysis.

The method can further include sending a communication to an employee of the retail store to signal the employee to interact with the customer based upon the analyzed behavior of the customer.

The communication can include an identification of a product being sought by the customer and materials about such product.

The method can further include providing marketing and advertising messages to the customer based upon the information gathered by the one or more information monitoring devices.

The plurality of modules implemented by the server can include a relevant rating engine module. The method can further include interacting with the customer to gather information of the customer's age and gender by interactive questioning.

The information monitoring devices can be selected from the group consisting of computing devices, user input and output devices, displays, POS devices, cameras, sensors; WIFI devices; in-store customer devices; output devices; system for communicating to user devices, and kiosks.

The method can further include using a coupon printer operatively connected to the server to print out a coupon for a customer based upon the information gathered by the one or more information monitoring devices.

In general, in another aspect, the invention features a non-statutory computer-readable storage medium tangibly encoded with computer-executable instructions, that when executed by a processor associated with a computing device, performs a method that includes using one or more information monitoring devices to gather information about a person in proximity of at least one of the one or more information monitoring devices. The one or more information monitoring device is operably connected to (A) a server, (B) one or more databases, or (C) both. A plurality of modules are implemented by the server. The plurality of modules are selected from the group consisting of demographic intelligence modules, traffic modules, object identification modules, engagement modules, review summary modules, client side content management and presentation system modules, virtual loyalty program modules, automated customer assistance at shelf modules, purchase at shelf modules, reporting modules, API modules, advertising broker rules engine modules, relevance rating modules, and combinations thereof. At least one of the modules in the plurality of modules is a demographic intelligence module. At least one of the modules in the plurality of modules is a tracking module. The method further includes analyzing the information gathered by the information monitoring devices using the plurality of modules.

Implementations of the invention can include one or more of the following features:

The step of analyzing can include analyzing the information gathered by the information monitoring devices in real-time using the plurality of modules.

The server can include a server located at the location operatively connected to cloud services.

The step of gathering can include using the tracking module to track the person within a predetermined area. The step of analyzing can include linking the information from the person gathered in the demographic intelligence module and the tracking module. The step of analyzing can include analyzing the information gathered by the information monitoring devices in real-time using the plurality of modules.

The tracking module can include a MAC address tracking module.

The one or more information monitoring devices can include at least three receivers located in or by the location for receiving information about the location of the person at a given time. The step of gathering can include using the at least three receivers to determine a distance between the person and the receiver at the given time. The step of analyzing can include using the distances between the person and the at least three receivers to track the person as the person moves about the location.

The non-statutory computer-readable storage medium tangibly encoded with computer-executable instructions further including that one or more displays operatively connected with the server. The one or more displays can engage persons at the location based upon the information gathered by the one or more information monitoring devices.

The location can be a retail store.

The step of analyzing can include analyzing behavior of customers in the retail store in real-time.

There are one or more displays operatively connected with the server. The one or more displays can engage the customers based upon the information gathered by the one or more information monitoring devices.

The displays can be interactive displays. The interactive displays can be information monitoring devices.

The step of analyzing can include determining what product within the retail store the customer is viewing.

The one or more displays can provide information to the customer based upon the information gathered by the one or more information monitoring devices.

The plurality of modules implemented by the server can include a MAC address tracking module.

The step of analyzing can recognize repeat customers of the retail store.

The plurality of modules implemented by the server can include comprises a reporting module. The method can further include generating a report based upon the analyzed behavior of the customers.

The plurality of modules implemented by the server can include a loyalty program module for a loyalty program for the retail store. The method can further include registering the customer to the loyalty program. The registration can include information of the customer that can be used to analyze behavior.

The step of analyzing can include analyzing the customer behaviors for comparative product analysis.

The method can further include sending a communication to an employee of the retail store to signal the employee to interact with the customer based upon the analyzed behavior of the customer.

The communication can include an identification of a product being sought by the customer and materials about such product.

The method can further include providing marketing and advertising messages to the customer based upon the information gathered by the one or more information monitoring devices.

The plurality of modules implemented by the server can include a relevant rating engine module. The method can further include interacting with the customer to gather information of the customer's age and gender by interactive questioning.

The information monitoring devices can be selected from the group consisting of computing devices, user input and output devices, displays, POS devices, cameras, sensors; WIFI devices; in-store customer devices; output devices; system for communicating to user devices, and kiosks.

The method can further include using a coupon printer operatively connected to the server to print out a coupon for a customer based upon the information gathered by the one or more information monitoring devices.

DESCRIPTION OF DRAWINGS

To further aid in understanding the disclosure, the attached drawings help illustrate specific features of the disclosure and the following is a brief description of the attached drawings:

FIGS. 5A-5C provides images of examples of various product promotions that can be used on the digital signage shown in FIG. 4.

DETAIL DESCRIPTION

This disclosure relates to monitoring and analyzing behavior in various applications. Generally, this disclosure relates to systems (and uses thereof) for monitoring and analyzing consumer purchasing behavior in real-time to drive sales via engaging digital customer experiences. This disclosure describes numerous specific details in order to provide a thorough understanding of the present invention. One skilled in the art will appreciate that one may practice the present invention without these specific details. Additionally, this disclosure does not describe some well-known items in detail in order not to obscure the present invention.

The system of the present invention utilizes one or more in-store computer systems tied to a cloud database and application server to monitor, analyze, and influence consumer purchasing behavior. These in-store computer systems could be in the form of a tablet PC, LCD panel PC, desktop PC, laptop PC, or any other microcontroller based system. Each of these systems may have WIFI capabilities (or other radio frequency communication protocol), a touchscreen display, and or a camera attached. Additionally, IP, USB or analog style video cameras (i.e., surveillance cameras) could be connected to either servers or PCs in-store or cloud based servers for customer behavior analysis. For WIFI device or other radio frequency (including Bluetooth or NFC) tracking, not only the PCs and devices mentioned above could be utilized, but also devices such as WIFI (or other radio frequency) access points or routers that are pre-programmed with software that will allow the device to perform WIFI sniffing activities and provide this information to PCs or servers in-store or in the cloud. WIFI device tracking is defined as the ability to monitor any device that has a WIFI networking chip and is broadcasting that devices individual Media Access Control (MAC) address.

An "information monitoring device" is a device in the retail store (or other location) that is capable of gathering information about the customer including automated devices (such cameras, displays) or interactive (kiosks, cell phones, PCs, tablets). The information captured by the information monitoring device is dependent upon the design of the particular information monitoring device.

Figure 1:
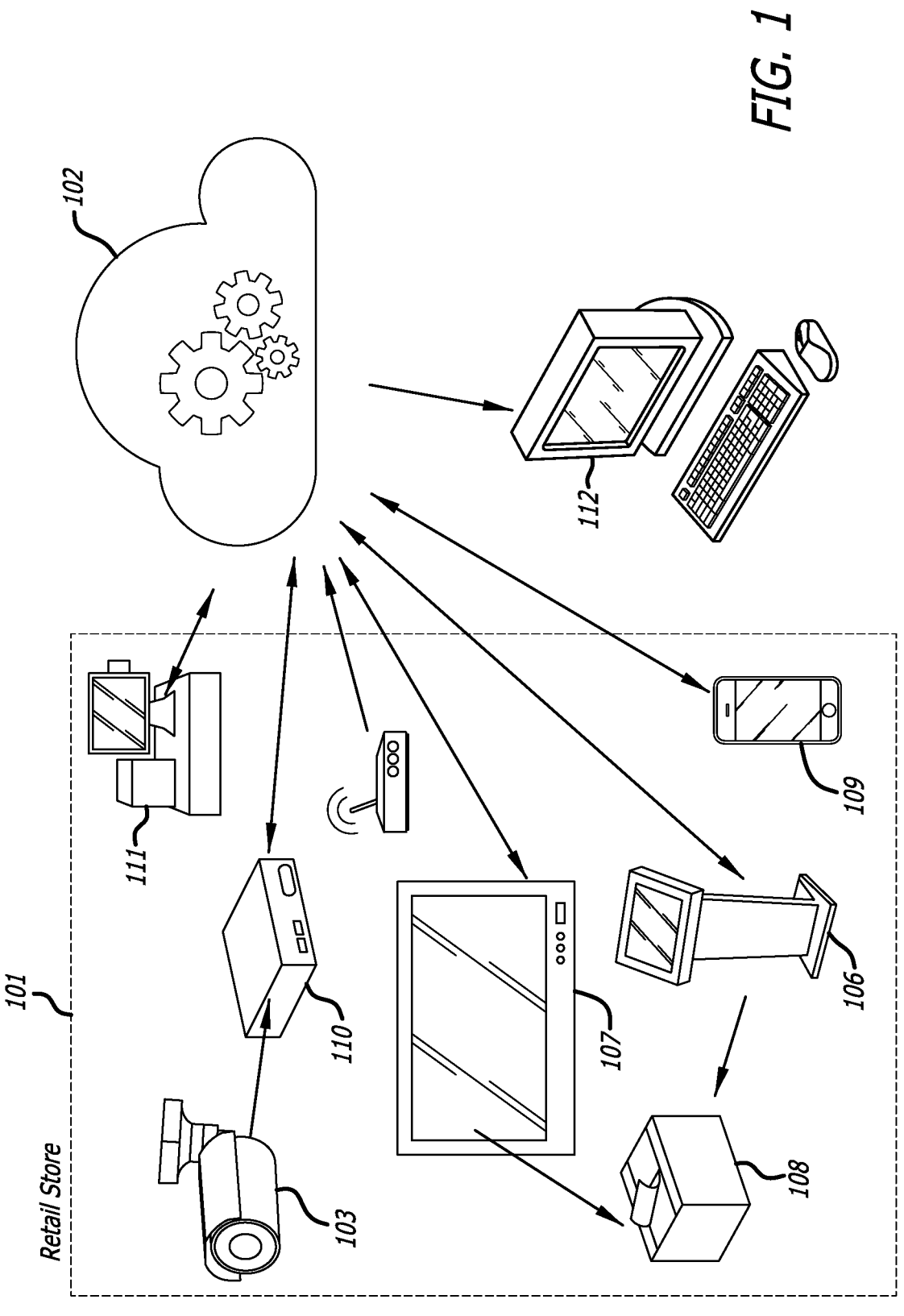
FIG. 1 illustrates an embodiment of the present invention.

FIG. 1 illustrates an embodiment of the present invention. In this embodiment, the system includes hardware and software that reside within a retail store 101 and the cloud 102. Within the retail store 101 there are cameras 103 (and other information monitoring devices) tied to information devices with and databases that are operable for capturing consumer purchasing behavior and product selection 104. Additionally, there are kiosks 106 that also capture consumer behavior and provide an enhanced in-store shopping experience. In order to interact with the consumer and provide influence, there are digital signs 107, coupon printers 108, communication devices for communicating and monitoring devices with radio frequencies such as Bluetooth and Near Field Communication. A shoppers mobile device that can connect to a cloud database to provide an enhanced shopping experience 110 Additionally, the store's transactional database 111 are operable for communicating with the cloud 102 data relevant to the retail store 101. The output of the system can include analytics, such as shown in report 112.

In addition to these devices being installed in retail stores, the capabilities of the system of the present invention are applicable to locations such as shopping malls, restaurants or other eating establishments, movie theaters, airports, hotels, taxi cabs, busses, schools and other commercial buildings. Additionally, the system of the present invention can be tied to a facilities surveillance system and tie WIFI device information to video surveillance footage captured by the surveillance system.

Demographic Intelligence Module

The system can be used to identify the customer's demographics using a demographic intelligence module. For instance, the demographic intelligence module utilizes algorithms known in the art (such as Intel AIM Suite or SightCorp Crowdsight) to determine a person's gender, approximate age, and sentiment (such as based upon video images captured by cameras or other information monitoring device). This functionality can be added to the traffic modules to provide an increased level of the retailer's knowledge of its customers. This provides an increased level of data that the system uses to determine the best messaging for the customer. All information shown on the display can be tailored towards a particular person's demographic criteria. For example, a customer could see reviews that were written by "someone like you."

Tracking Modules

The system can include one or more types of tracking modules to monitor customer traffic throughout the store or other location. Such tracking modules include traffic counting modules, MAC address tracking modules (or other mobile device tracking modules), and eye tracking modules.

Traffic Counting Module

The present invention is capable of monitoring and analyzing customer traffic. The traffic counting module of the present invention determines the number of people that walk by and stop at a given point (such as a display or end cap). Utilizing a camera (that can, for example, be built into the system's device (Panel PC, tablet PC, LCD screen, etc.), be attached to the device by cable or an IP network, be an analog camera), the system can capture each person's age, gender, and sentiment or reaction. The system determines where the unique person is standing in each frame, for how long, and where he or she moves to and from. This allows the system to generate a heat map of customer traffic information at a particular shelf level.

In addition, the system can utilize an interactive display either built into or attached to a device to deliver a personalized marketing message that is relevant to the customer's behavior. This message can be determined based upon the customer's demographic and sentiment information, the customer's location at the shelf, and his or her duration at the shelf. Additionally, the system logs all activity to optimize and personalize the message.

Utilizing machine learning algorithms along with things such as customer reaction, dwell time, location, and interaction with the display—the system can determine the right message to display to the right customer at the right time. Essentially, the system will be able to perform testing automatically, creating a virtual focus group to help manufacturer/merchandizers and retailers optimize messaging.

MAC Address Tracking Module

The system of the present invention can also have a MAC Address Tracking Module. Smart phones and other mobile devices today have WIFI and Bluetooth built into them. By the standard of WIFI, devices such as smart phones, mobile computers, and tablets, are continuously device looking for networks to communicate with. To accomplish this, these devices are continuously broadcasting a header which contains that particular devices Media Access Control (MAC) address. A MAC address is a networking identifier address that is unique to that particular device. There will be no other device in the world that would share a MAC address. Additionally, Bluetooth devices also have unique MAC addresses that are also broadcast when Bluetooth is enabled and the device is looking for other devices to connect, or pair, with.

When a phone or other device with WIFI or Bluetooth enabled enters a location having an embodiment of the present invention, the device will send out a request to communicate, and that request will include the device's MAC address. The system will capture this address along with the devices signal strength and will immediately place a one-way hash encryption on the MAC address. This ensures that no personally identifiable information (PII) is being stored, and alleviates any privacy concerns. This hashed MAC address will be unique to each device; however, the system will not be able to determine the devices actual MAC address. Using the signal strength and an algorithm, the system is able to determine the distance of the mobile device from the receiver/transmitter of the system.

Utilizing multiple receivers/transmitters in a store with a pre-determined or known location, the system can triangulate on each individual device. This allows the system to identify the location of each device at any given time. With this information, the system can then create information such as the path that customer took throughout the store, where they stood and for how long, and whether the customer went back to certain sections of the store. This information can also be used to determine areas of the store that have high or low traffic, and what the customers' traffic patterns are. Additionally, the system is able to determine what customers are repeat or frequent customers.

In another embodiment, the one receiver/transmitter in a store with a pre-determined of known location can determine the location of the individual device. For example, the receiver/transmitter can monitor the strength of the signal and determine near proximity of the mobile device. A camera or other video image device can then work in combination with the receiver/transmitter to synch the image with the signal. In some circumstances, there could be more than one potential persons within the signal range. However, as the potential persons move about, their movement and any change in signal strength can be used to more affirmatively identify the person associated with the signal. This association/confirmation of the person with the particular mobile device can be alternatively/additionally determined by another receiver/transmitter (in combination with a camera or other video image device) that operates similarly.

The present invention can utilize many different types of systems to capture, store, and analyze a devices path via MAC address. These systems include, but are not limited to: a tablet PC with WIFI capabilities, panel PC with WIFI capabilities, desktop PC with WIFI capabilities, WIFI access points, or other microcontroller based devices with WIFI capabilities.

A primary purpose of the MAC tracking solution is to provide the best shopping experience for the customer. Should a customer decide to opt-out of the MAC tracking system, the customer can do so via the web. Should the customer use the web to opt-out of being monitored by the system of the present invention, the customer would need to provide his or her device's MAC address.

Alternatively, other information can be similarly tracked for by an application that has been loaded onto a mobile device (such as a smart phone app). The application can emit a signal or respond to a request in response to a signal that is perceived by the information monitoring devices within the store. The application can be an app that was pre-loaded on the mobile device. Alternatively, the application can be loaded within the store (such as by scanning a QR code within the store) for such purposes. For example, a display can inquire whether a customer wishes to be tracked while in the store and provide a QR code that, when scanned, would result in the downloading of the application to the mobile device. During such period, the customer could also be asked to register other demographic information.

Eye Tracking Module

Retailers and brands are always trying to determine where customers are looking and what attracts their attention. Today, there are very expensive products that can be installed on shelves to only watch a customer's eyes and determine where they are looking. Utilizing the system's built-in camera, the system can use retina tracking to determine what products a customer is looking at on a shelf.

Part of the face detection algorithm of the demographic intelligence module plots a point on the customer's iris. From this information, the system can determine where the customer is standing and therefore determine the products or information that customer is looking at. Additionally, the system can determine look and dwell time and therefore determine the level of product interest, i.e., the products the customer is most interested in. This offers the same level of depth of other retinal-tracking devices but with all the added benefits of that comes with the present invention.

Object Identification Module

The system can include an object identification module.

Detecting what products a customer interacted with, when, and for how long is invaluable to retailers and brands. Utilizing either the built in camera or an external camera connected to the system of the present invention, the system is capable of determining when customers pick up and put down products, how long they hold the product, and ultimately what product they walked off with.

Figure 2:
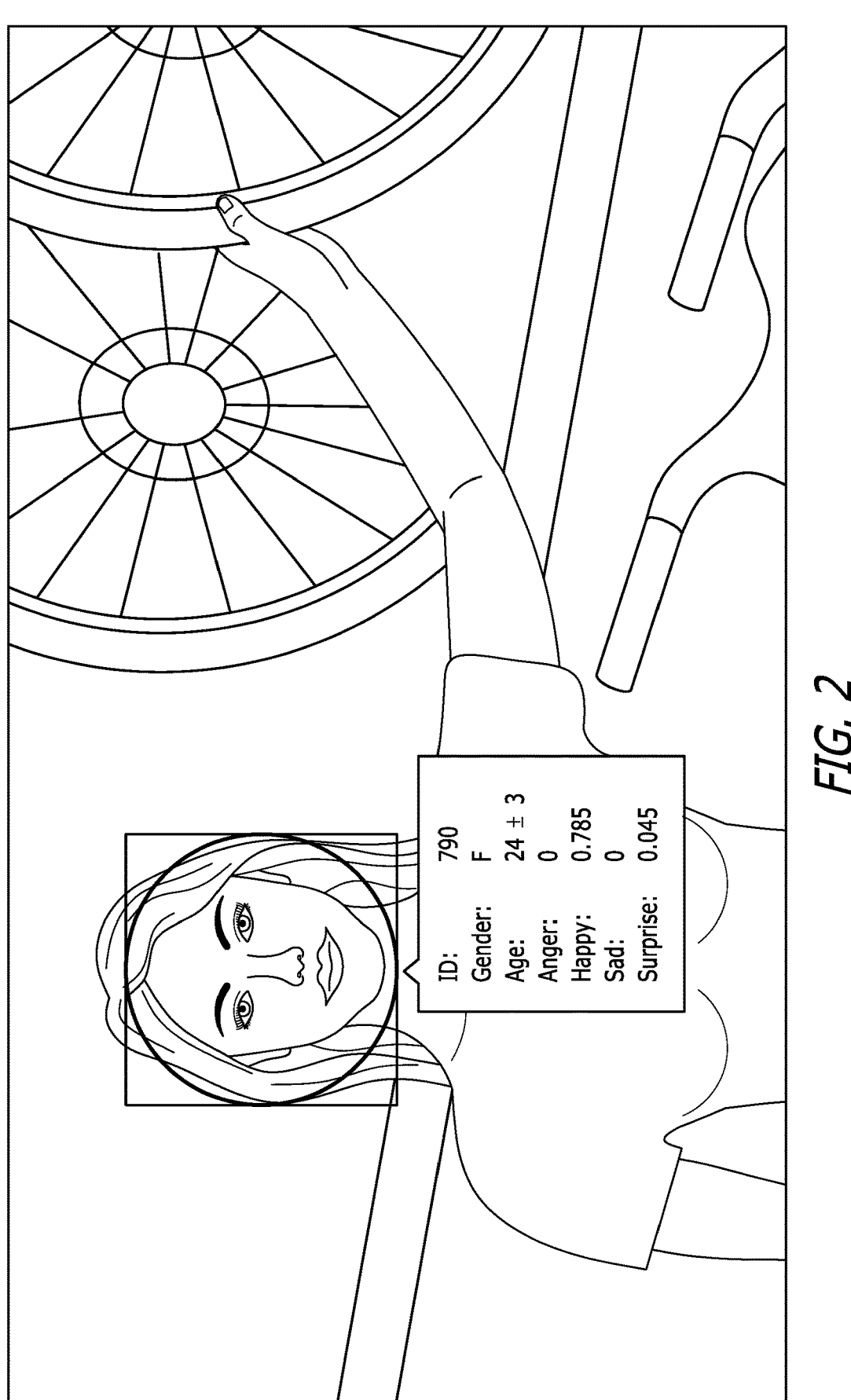
FIG. 2 illustrates an image that can be captured using an information monitoring device for an embodiment of the present system

External cameras can include IP based, USB, or CCTV cameras-including security cameras that are already installed in retail stores. FIG. 2 illustrates an image that can be captured using such an information monitoring device of the system. Additionally, the system is able to dynamically message to customers using digital signage information about the products that they have picked up and are interested in. Additionally, the system is able to promote products that are similar to the ones the system has determined the customer is interested in, particularly those that the retailer either wants to move—due to characteristics such as high inventory levels or product end-of-life—or that the manufacturer/merchandizer has paid money for its product to be promoted or advertised. For example, this promotional information can be in the form of reviews, ratings, feature set, description, promotions, offers, pictures, and videos.

A database within the system contains the object recognition information. This could include image templates of each product that the retailer wishes to monitor. To increase accuracy and reduce processing power and processing time, each camera can be utilized with only the portion of the image template database that is relevant to the products that are on the shelf in the area of that particular camera.

Additionally, geographic regions can be utilized to improve accuracy. For example, if on a retail shelf, a geographic region would be created around a certain camera. The system will not only be able to use object recognition to determine what product the consumer is evaluating, but the system will also be able to determine that the product within that defined region was moved by the customer. This provides two different methods of determining what object the consumer was evaluating.

Engagement Modules

The system can include one or more types of engagement modules to engage the customer as he or she moves throughout the store or other location.

Display Only Module

Figure 3:
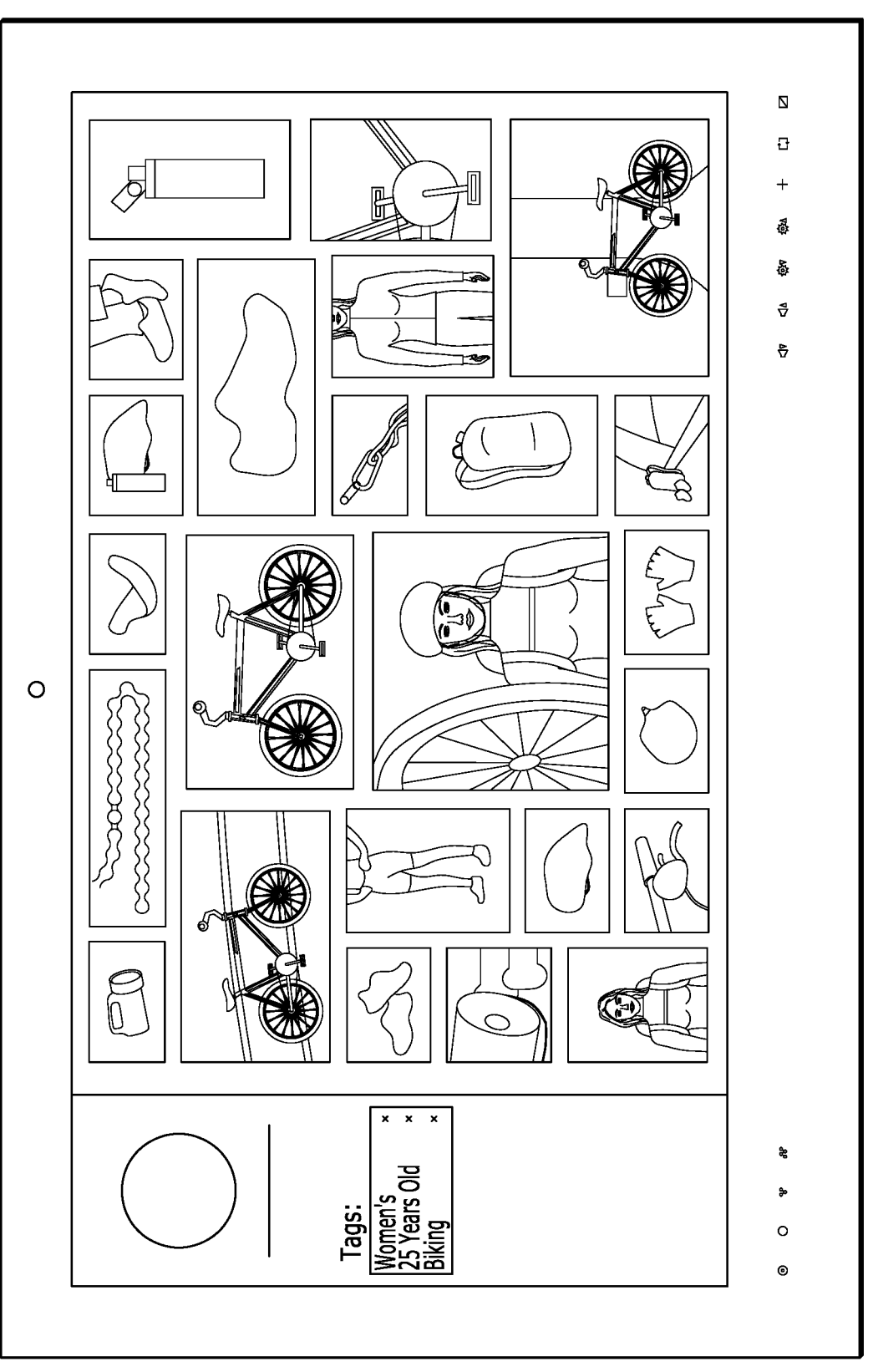
FIG. 3 illustrates a smart interactive digital signage of a display only module for embodiments of the present invention.
Figure 4:
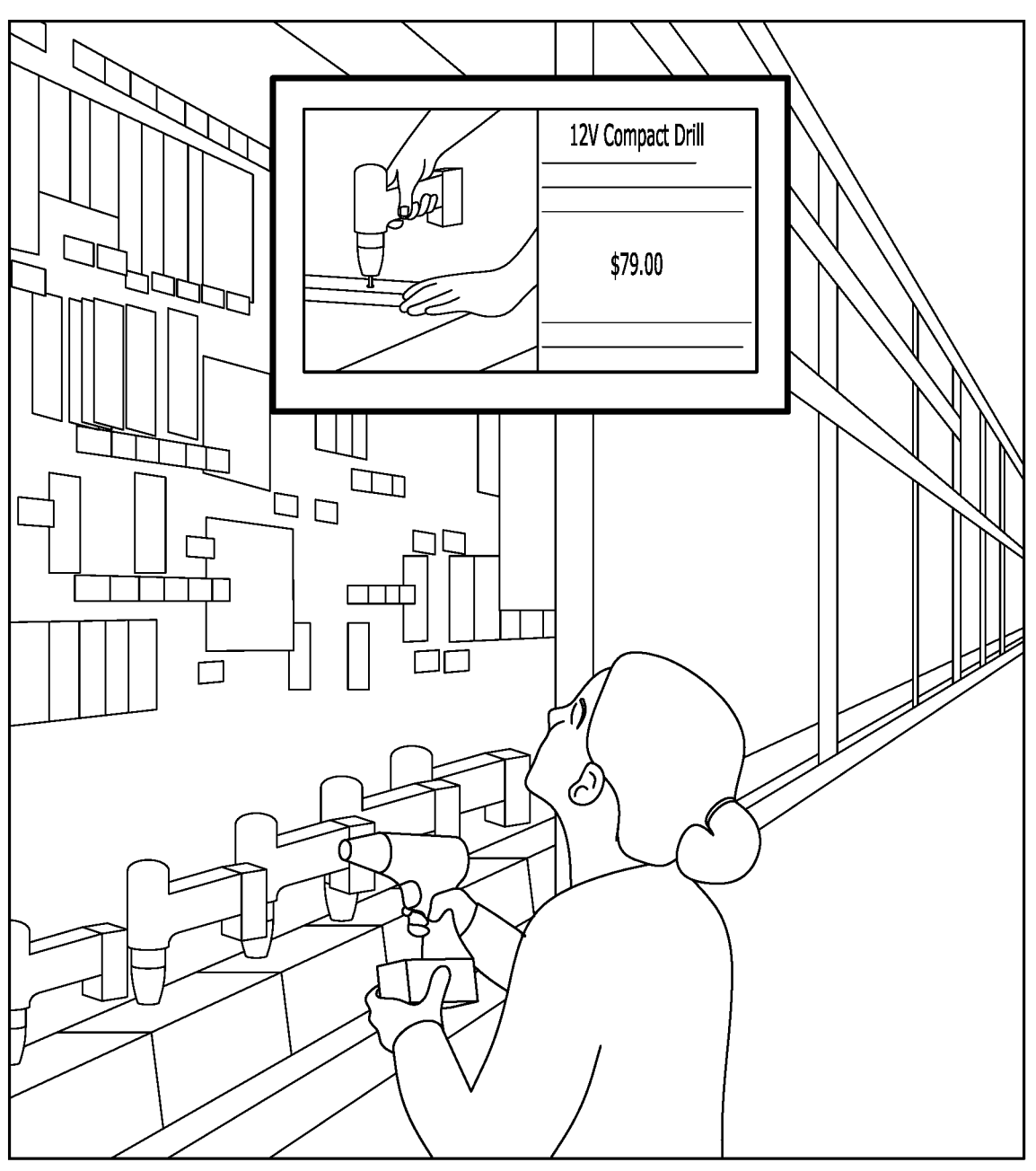
FIG. 4 illustrates an image showing such digital signage for an embodiment of the present invention.
Figure 5A:
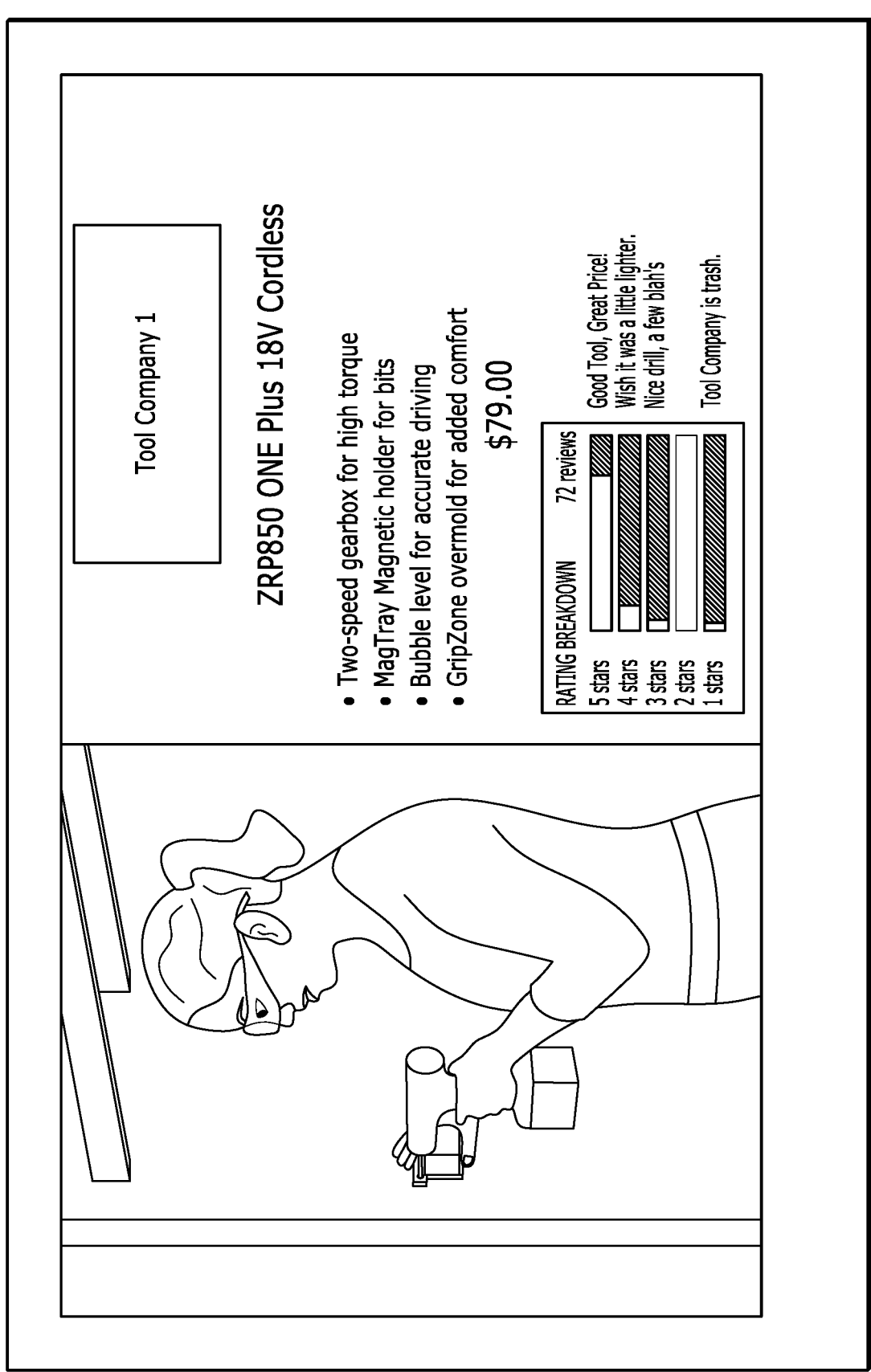
Figure 5C:
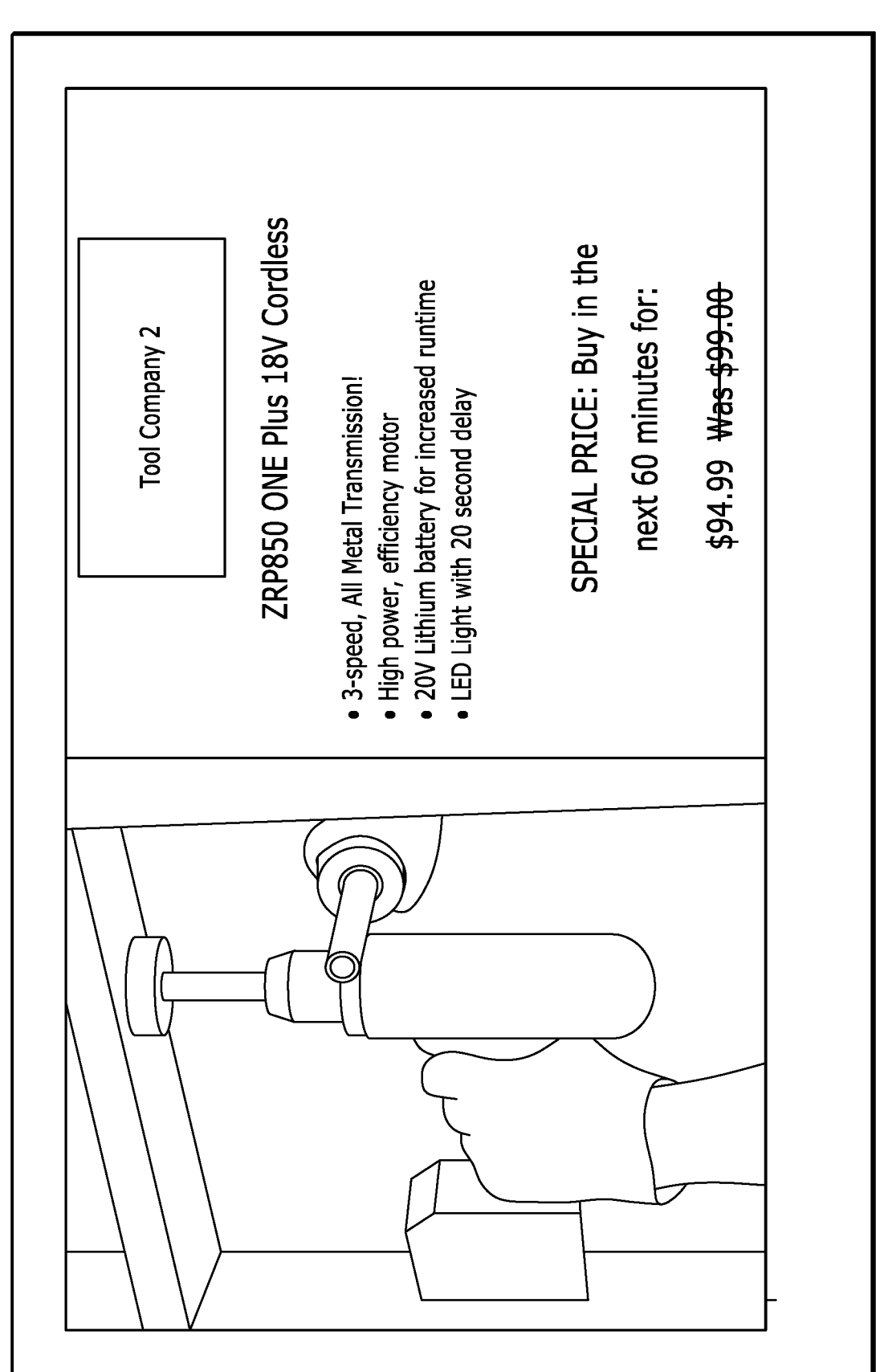

Shoppers today demand personalized experiences. Online outlets are able to provide such experiences, however, brick-and-mortar retail is not able to create the shopping experience that encourages buying. The present invention is able to engage the customers using smart interactive digital signage, such as illustrated in FIG. 3. Such signage of the present system can provide customers with the information they expect today to make educated purchases. FIG. 4 illustrates an image of digital signage in a retail store at the shelf. FIGS. 5A-5C provides images of examples of various product promotions that can be used on such digital signage.

Figure 6:
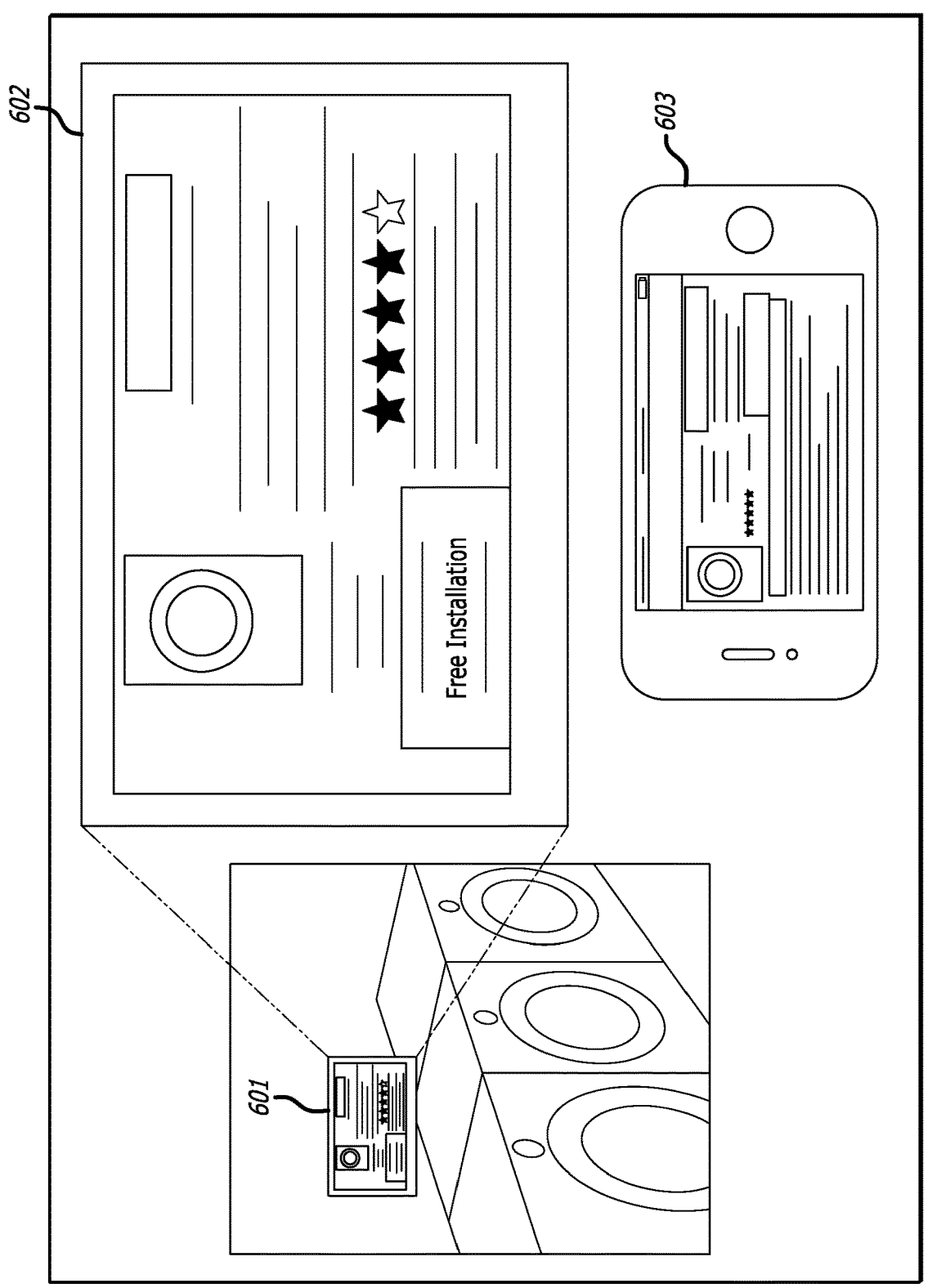
FIG. 6 discloses an LCD panel location and mobile display for embodiments of the present invention.

With a display-only module of the present system, an initial message can be displayed. This message could include, for example, an advertisement for the retailer or brand, video, store logo, or product pictures. Once a customer approaches the display, a broker rules engine of the system is operable to decide the next message to display. The information (or message) that is displayed will generally be product level-including product reviews, ratings, twitter or other social media content, videos, feature set, or product description. Types of displays include Panel PCs, LCD TVs, Monitors, or mobile devices-such as phones or tablets. FIG. 6 illustrates sample display location and types, such as LCD panel 601 (magnified in image 602) and a mobile display 603.

The system can also include an intuitive web-based content management module. This web based content management system allows retailers or manufacturers/merchandizers to upload and activate content to be displayed on demand. This allows retailers and manufacturers/merchandizers to perform valuable comparison marketing testing on messages displayed to their customers and determine the effectiveness of each message. The effectiveness can be determined through various methodologies, such as integration with a retailer's Point of Sale (POS) system, attentiveness, or engagement with the display.

Utilizing input methods (such as touch, gesture recognition, and eye tracking), the customer can navigate through the display to obtain the information he or she needs to make that buying decision. During this time, the system of the present invention is tracking user attentiveness, how long the customer stays at the display, what the customer clicks on the display, where the customer stands, what direction the customer moves after viewing the display, promotions offered, and promotions accepted. The intelligence gained through this customer behavior enables retail marketers and merchandisers to make decisions on the effectiveness of messaging that they display to customers. Essentially, retailers and brands can now perform virtual focus groups for comparison testing of their marketing messages.

In order for a manufacturer/merchandizer to promote their product within a retail store, the manufacturer/merchandizer typically will pay marketing development funds to that retail establishment. Utilizing the system of the present invention, retailers can now monetize advertising revenue from one or more brands at a single point location due to the ability to add up-sell and cross-sell opportunities. These up-sell and cross-sell opportunities are in the form of pay-for-placement spaces. A manufacturer/merchandizer (i.e., brand) can pay a retailer a certain amount for an advertising position within the rules engine of the present invention. Then, based upon weights assigned to each brand or product, that brand or product could be displayed as an up-sell or cross-sell product to what the customer is actually looking at.

Display With Demographic Intelligence Module

In today's environment, customers are looking for more relevant and personalized shopping experiences. The ability to add demographic intelligence to a retailer or a brand's current data set is invaluable to achieving this. Retailers and brands can use this information to perform activities such as product mix, inventory, placement, and marketing optimization. For the customer, having their demographic information can provide them the personalized shopping experience that online retail provides but brick-and-mortar retail cannot today. Additionally, capturing sentiment information (% happy, % sad, % angry, % surprised) further allows the retailer or brand to track a customer track reaction to certain messaging. With this knowledge, a retailer or manufacturer/merchandizer can optimize the messaging based on sentiment and demographic intelligence—further providing a more personalized shopping experience for the customer.

Figure 7:
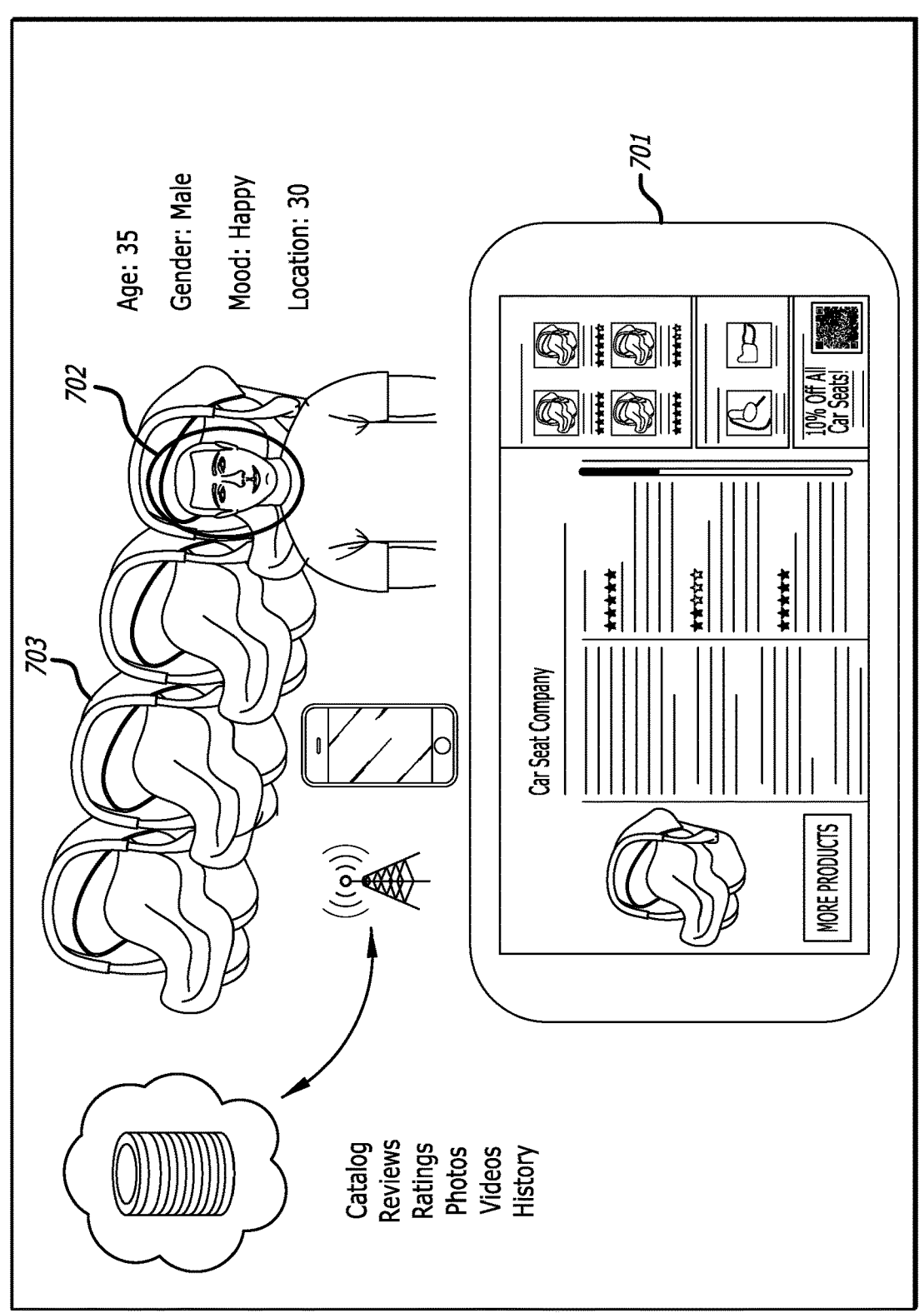
FIG. 7 illustrates a display with demographic intelligence module for embodiments of the present invention.

When a customer approaches one of the displays of the present invention, the system will determine the customer's age, gender, and sentiment information. Additionally, the system will count the number of customers that walk by the display—and in what direction they move. The system will log this information—along with other traffic information—and then display a message 701 that is personalized to the customer 702 at the shelf 703, as illustrated in FIG. 7.

Figure 8:
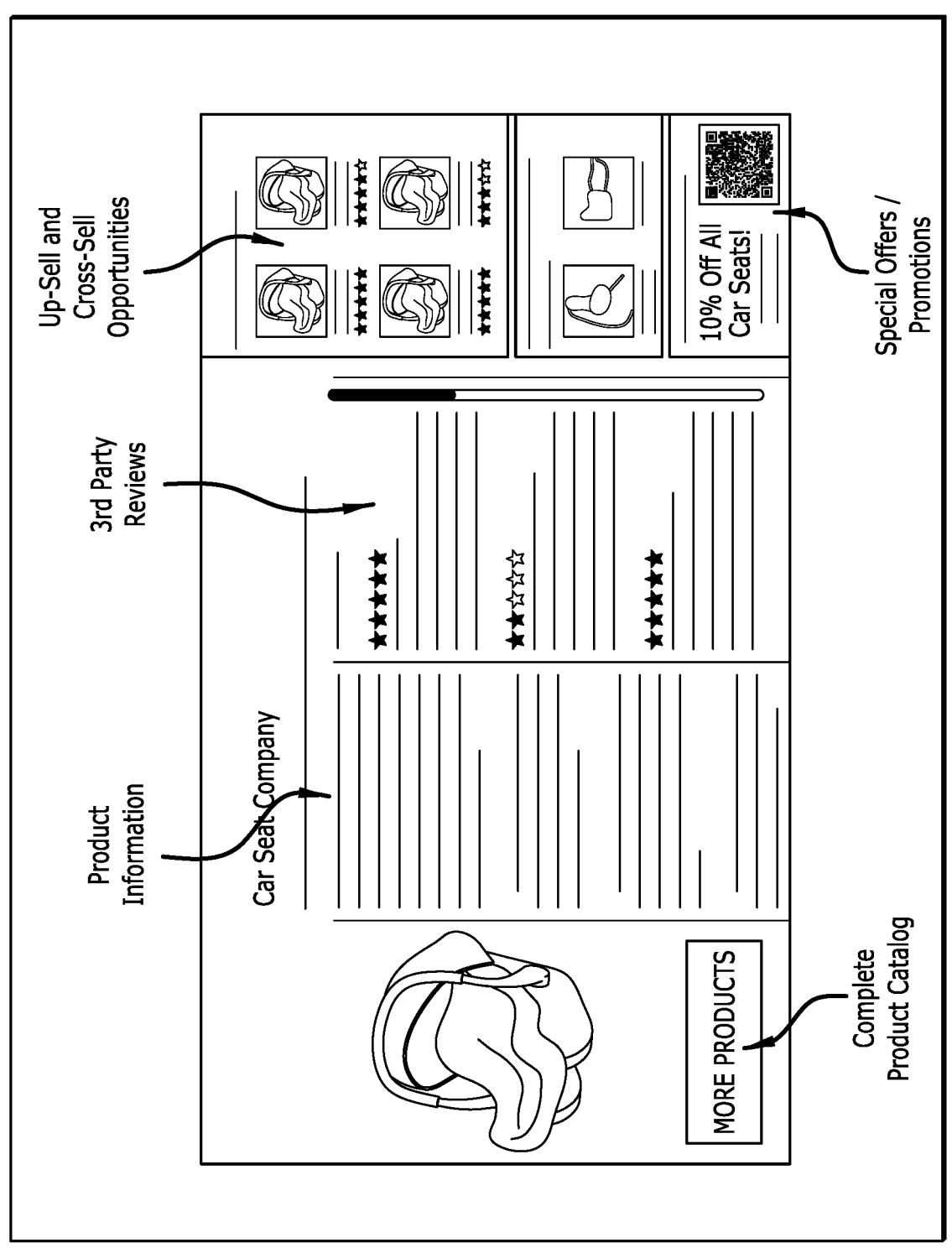
FIG. 8 illustrates the sample display content of the display of FIG. 7.

All content fields shown on the display can be optimized per demographic and sentiment information. This content can include ratings, reviews, feature set, description, up-sell, cross-sell, and promotional information as illustrated in FIG. 8.

Utilizing input methods (such as touch, gesture recognition, and eye tracking), the customer can navigate through the display to obtain the information the customer needs to make his or her buying decision. During this time, the system is tracking user attentiveness, how long the customer stays at the display, where the customer stands and moves to, what the customer clicks on the display, promotions offered, and promotions accepted. The intelligence gained through this customer behavior enables retail marketers and merchandisers to make decisions on the effectiveness of messaging that they display to customers. Essentially, retailers and manufacturers/merchandizers can now perform virtual focus groups for comparative testing their marketing messages. Content used for this comparative testing is easily managed through system, such as by using a web portal. Additionally, the system can use machine learning algorithms to autonomously determine the optimal message to display to each customer based upon demographic intelligence.

Display with Demographics and MAC Address Module (Multiple Devices Throughout Store)

Simply replicating the digital environment within the brick-and-mortar is not a good enough reason to choose physical retail over online. That is why the present system exceeds the online experience by delivering an unmatched level of personalization while keeping the user's identity anonymous. Using the present system's Wi-Fi sniffing capability (mobile device tracking module), every customer that enters the store is assigned an encrypted identifier with a one-way hash MAC address. This identifier cannot be traced back to the customer personally, but can be utilized as a customer identifier for personalization system of the present invention.

Figure 9:
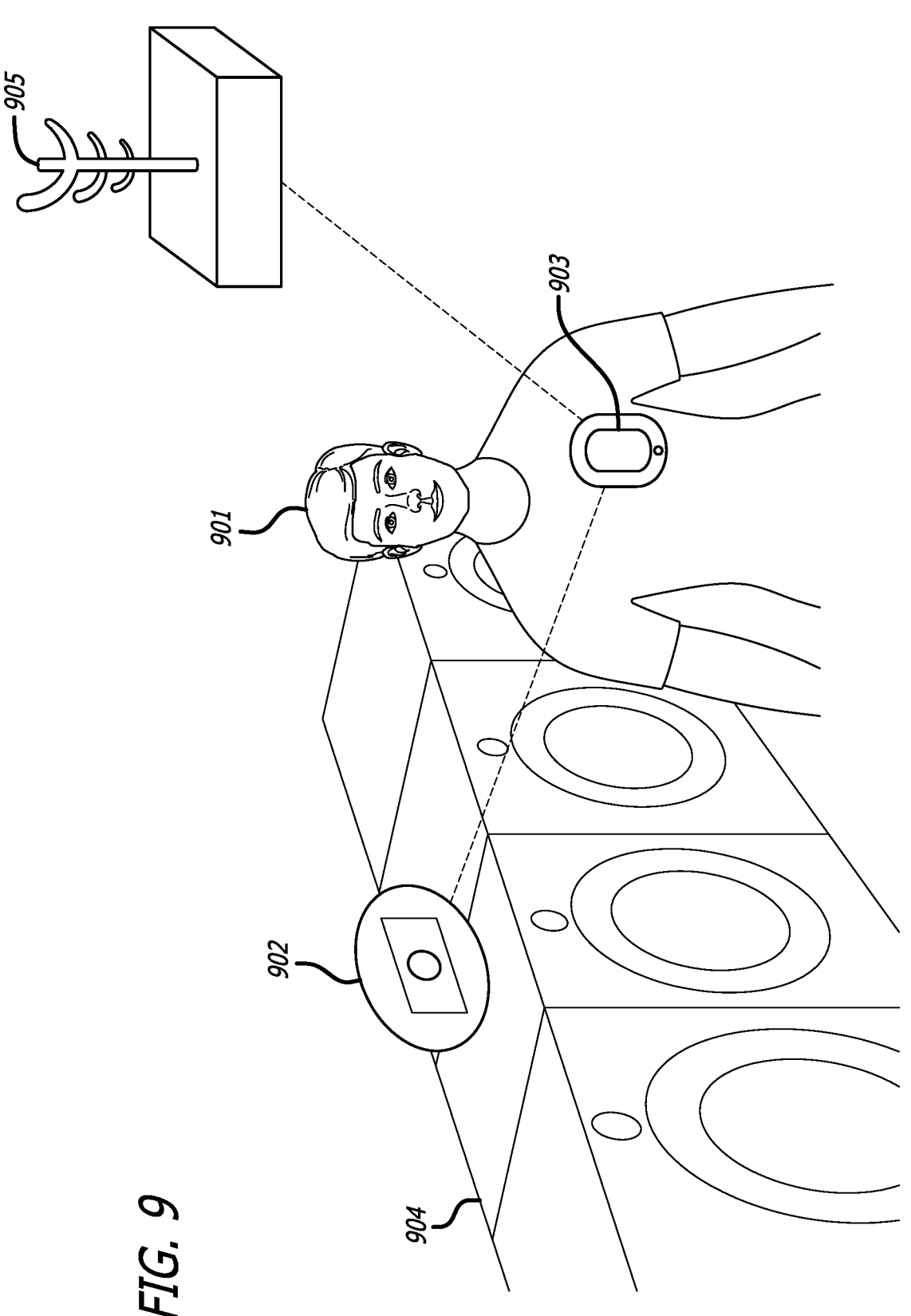
FIG. 9 discloses MAC tracking and promotion at the shelf.

When a person (i.e., customer 901) approaches an information monitoring device 902 (such as a display), the system can automatically recognizes demographic and sentiment information of the customer 901, as well as the hashed MAC address of the customer's mobile device 903. This hashed MAC address is tied to all of the customer's interactions with the information monitoring device 902 and the in-store products 904 (such as, washing machines), creating a detailed history from which future purchasing preferences can be determined. Based off of demographic information, previous purchase history, and online and offline browsing history, the present system provides a content rich shopping experience not previously offered. This occurs the instant the customer 901 approaches a display 902 (or other information monitoring device) as illustrated in FIG. 9, and without requiring a username and password. Furthermore, the system of the present invention continues to learn what the customer 901 likes and dislikes are, and what drives them to purchase. As shown in FIG. 9, the information monitoring device 905 (i.e., a transmitter/receiver) that receives the signal including the hashed MAC address from the customer's mobile device 903 can be separate and apart from the information monitoring device 902. In other embodiments, the information monitoring devices 902 and 905 can be the same information monitoring device.

Figure 10:
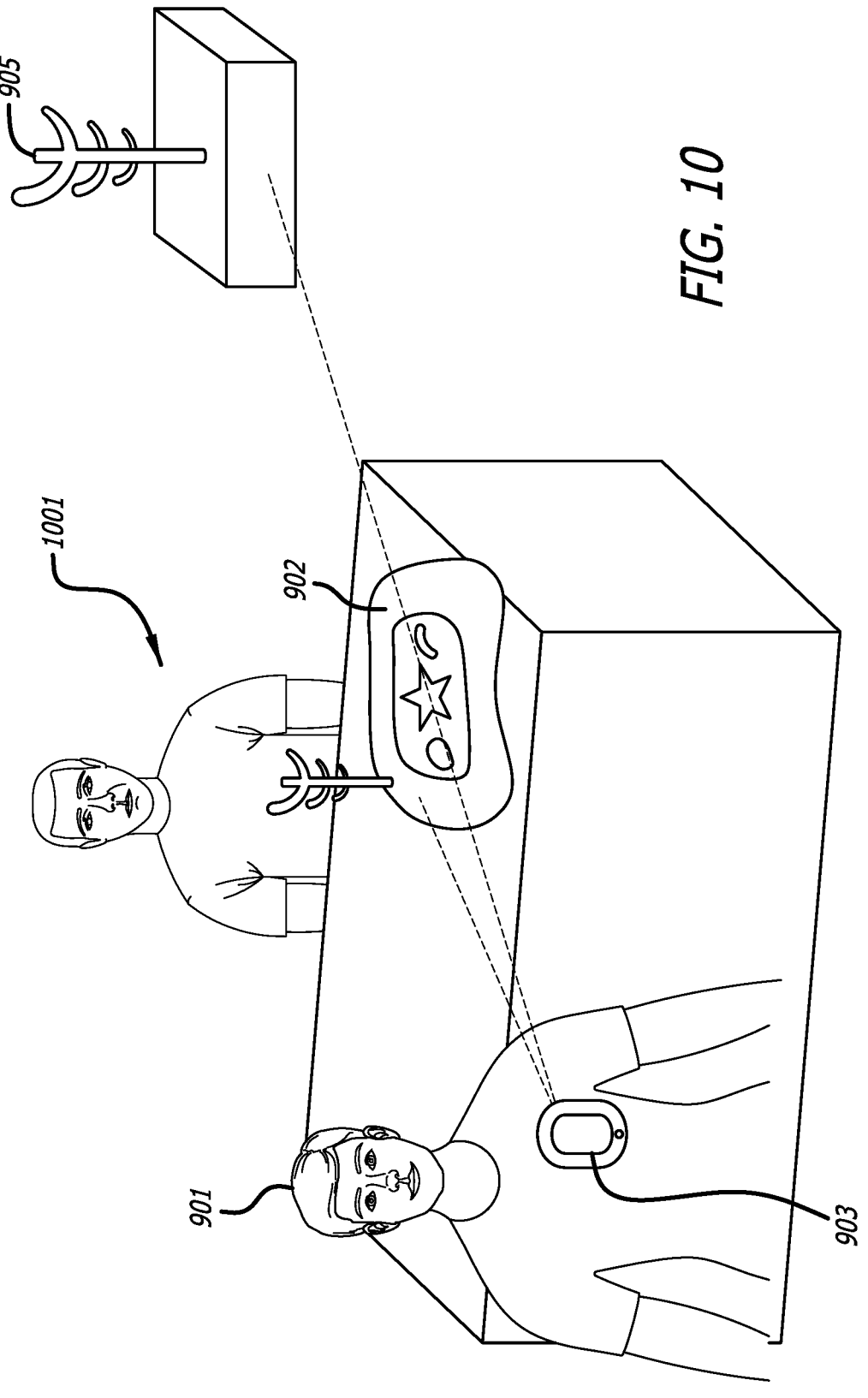
FIG. 10 discloses MAC tracking and promotion at the register.

This functionality is not restricted to a single information monitoring device either; the devices of the system are able to communicate with each other in-store and the cloud, allowing the information monitoring devices to share customer information store-wide. Relevant messaging no longer is restricted to the one device a customer was using to look up product info. Now, messaging can be delivered anywhere in the store to help aid in new purchases as illustrated in FIG. 10, which shows a customer 901 at the POS system 1002 (i.e., the register). In an age where the customers' lives are consistently open to the world, the present system offers a unique utility that protects the customer's identity while still delivering a superior personalized experience.

Display with Demographics and MAC Address Module (Single or Few Device Scattered Throughout Store)

The system of the present invention expands the scope of the brick-and-mortar. Similarly, the system operates beyond a single display (or other information monitoring device). One or more information monitoring devices can be located within a store and can operate in tandem with each other, greatly magnifying its capabilities. While customers are browsing the store, the system's on-board cameras are constantly monitoring their movements and dwell times at the shelves. Additionally, utilizing the WIFI tracking module (or other mobile device tracking module), the system can determine a customer's browsing profile at the shelf-including the traffic flow of each customer, and how long the customer spends at each shelf. This information, like everything else within the system, is then recorded and analyzed for further message improvement and personalization. This means that demographic information, previous transaction history, and online and offline browsing history that is used to display content to the customer is not solely relevant to the product immediately in front of the display. Based upon the customer's in-store and/or online browsing history, the system can determine what message to display to the customer when the customer approaches the display. The system predicts that a customer is approaching a display, and based on previous browsing history, can display a message in real-time that will influence the customer's purchasing decision. Information could be related to products that the customer stood around either that day or during previous trips to the store.

Customers can still interact with a device to purely browse different products, but with multiple devices in operation, a customer can get a recommendation when walking by a display on headphones because of their dwell time in the music section. As far as scope goes, this level of customer messaging is unprecedented.

Example of Retail Store Layout

Figure 11:
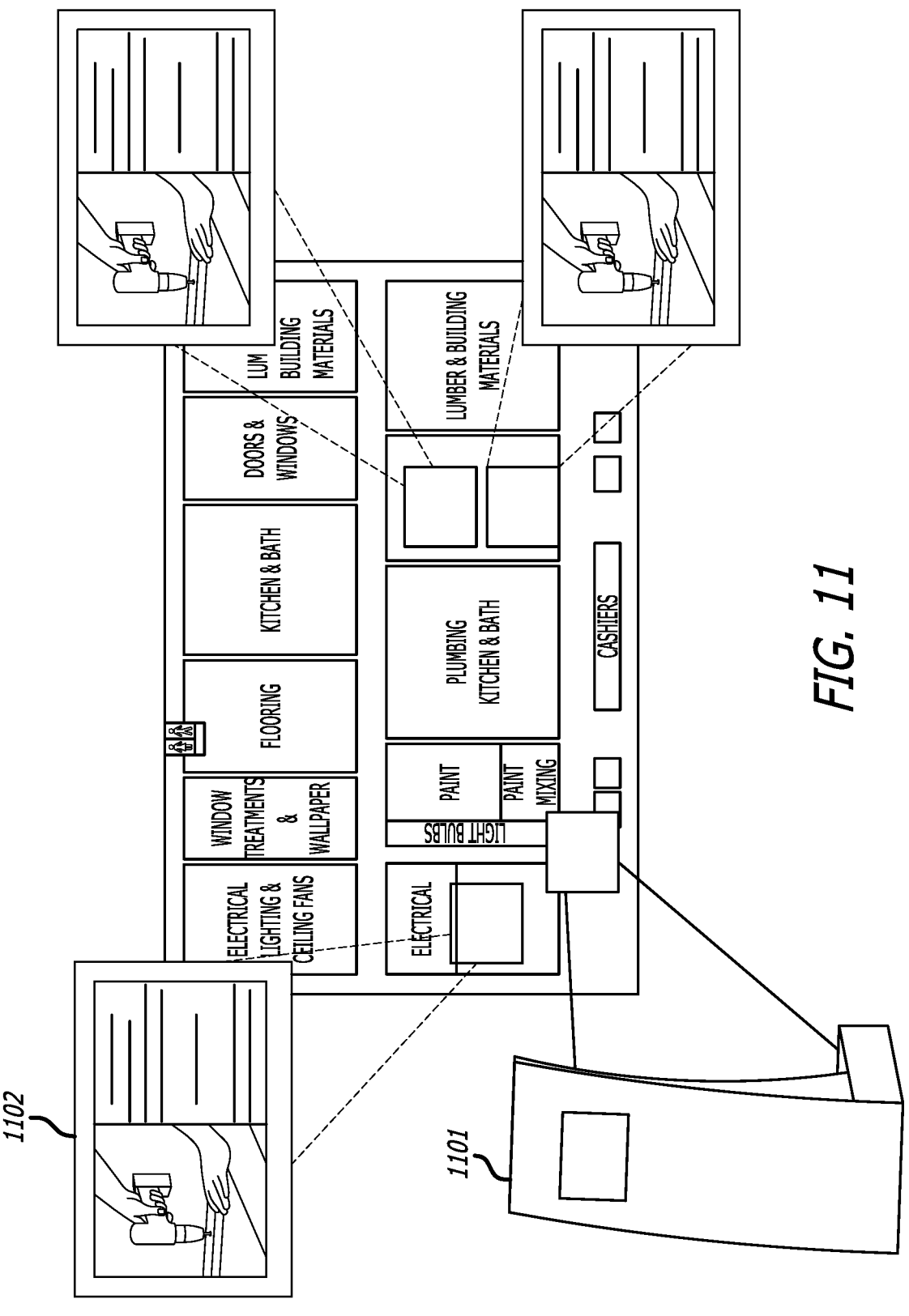
FIG. 11 is an example of the layout of representative information monitoring devices within a retail store.

FIG. 11 is an example of the layout of representative information monitoring devices (such as a kiosk 1101 and displays 1102) within a retail store.

Reviews Summary Module

The system can include a reviews summary module for generating and tailoring information and review summaries. The present system offers a variety of added benefits, but at the core, the system's goal is to provide pertinent product information and reviews for the customer. It is because of this lack of information that 60% of showrooming customers choose to buy elsewhere. Without addressing this impediment effectively, then the supplementary benefits become futile. The present can deliver reviews for both the high-involvement customer, as well as the low-involvement. This means that reviews can come in a variety of forms, according to the customer's preference.

For the high-involvement customer, a large variety of customer and professional reviews are available to scroll through. On the other end, the system is capable of compiling those reviews into a succinct and comprehensive summary based on keywords found within the description of the product. For example, "80% of reviews say the product has an excellent battery life" or "30% of reviews say it has quality issues". By presenting information in this fashion, a customer can get a snapshot of the product offerings. In many cases, this may be enough to secure a sale; but if the customer wants more, the system can offer the full range of detailed reviews to guarantee the customer feels good about the purchase.

As with other aspects of the present system, these reviews can be tailored to the customer. Reviews can be generated by "someone like you," relating to the customer based upon demographic information. All of this is in addition to other smaller-scale reviews such as the number of stars or "likes" on Facebook. Twitter and other social content could also be curated to provide information that would influence the customer purchasing decision-which could be presented based upon demographic information. For example, people under 30 are presented curated Twitter content about products rather than reviews if it is determined that tweets drive sales more effectively than reviews. By providing a variety of information, most customers can find something to assure them on his or her potential purchase.

Client Side Content Management and Presentation System Module

The system can include a client side content management and presentation system module. With the present system, the brick-and-mortar retailer is empowered with more control over the retail space and thus more control on over how it influences customers. Through the client-side interface of the present system, retailers can easily manage the content that is displayed to individual customers.

Although it may seem daunting to manage personalized content for a vast and diverse customer basis, the system of the present invention enables the process for the retailer. Based upon the system's immense database of customer data such as demographics and sentiment, managers can view what content has been, is being, and will be displayed to the different segments. With the hashed MAC address functionality enabled, this utility is greatly expanded, allowing content to be personalized based upon prior purchase history and browsing history. In this way, the system no longer predicts potential purchases based on segment-wide trends, but facilitates purchases based upon the individual customer's expressed interests. The retailer can easily manipulate this personalized content as well, providing a method to perform comparative testing to determine what the optimal messaging is to display to an individual or type of individual to drive the conversion.

Within the same vain, retailers can manage the 'promotional weight' of each product. This regulates the priority some products have over others to be displayed to customers. Retailers determine this in the contracts with the individual manufacturers/merchandizers, which provides the manufacturers/merchandizers with another outlet to raise awareness to their products (and their brands) and the retailer with another outlet to comparative test and raise revenue.

Using pertinent customer data and the different promotional weights, the present system has the ability to promote the 'best fit' product. The system is capable of determined this best fit by the customer's demographic historic reaction to different products as well as the factored in promotional weight assigned to the variety of products. As discussed above, browsing history is a powerful indicator of what content to display. However, the system of the present invention particularly takes notice of previous history of the current visit of the customer, which strongly indicates immediate customer interests. A customer may have come into the store regularly for music, but may be looking at cameras for one visit. The present system takes advantage of this and renders promotions during the same visit for cross-sell opportunities, capitalizing on the impulse buy and customer's day-to-day interests.

Virtual Loyalty Program Module

The system can include a virtual loyalty program module. Traditional loyalty programs are not perfect. Although they do in fact offer special offers and rewards to loyal customers, thus bolstering their repeat customer basis, they often alienate the occasional customer. Much like the store-specific applications that are available for most smartphones, there are multiple requirements that must be met before the retailer can effectively connect with the customer: (1) Customers must be aware of the program, (2) customers must have a perceived value of the loyalty program that exceeds the effort to sign-up, and (3) customers must have the motivation to sign-up. These three seemingly trivial steps to customer engagement, actually hinders a broader array of customer engagement.

The present system solves these problems and overcomes these hindrances by creating a virtual multi-tier loyalty program. This program provides an engaging customer relationship free of commitment while still offering added benefits depending on customer interest. This way the retailer guarantees that every customer who walks through the doors is effectively addressed and captured, while providing the option to that customer to engage further with the store.

The first tier is free and of no cost to the customer. Repeat customers are automatically tracked by the present system by the hashed MAC address that is identifiable to the individual. As explained above, by triangulating the perceived signal strength of the MAC address, the present system can determine what products or categories of products the customer is most interested in. This information is then used to display special messaging to the individual customer through the system's information monitoring devices essentially fulfilling the role of traditional loyalty programs—except the system is able to make this all possible in-store and during a one-time visit.

The customer is not required to take any steps to experience the initial offerings of the virtual loyalty program. Instead of waiting for the customer to connect with the retailer, by utilizing the present system, the retailer can take the initiative and connect with the customer first to form the basis of a lasting relationship. This allows the brick-and-mortar to capitalize on the occasional customer and the impulse buy that is lost with traditional loyalty programs. The present system accomplishes all of this while also providing valuable business intelligence to the retailer that is otherwise not possible.

Beyond the first tier, the system offers the customer the option to easily opt-in to receive special offers for those who sign-up. This tier reflects what traditional loyalty programs do today but is improved upon because of the presence of the first tier. Customers are more apt to sign up due to their positive previous experiences. In addition to this, the level of commitment to experience the added benefits is very small. By using the additional piece of identifying information in contingency (i.e., combination) with the hashed MAC address, the system can make contact with the customer outside of the retail space. For example, if a customer spent fifteen minutes in the plasma television section but did not purchase anything, the system can send them a follow-up e-mail with additional information and special offers on plasma televisions. Traditional methods can recommend products based on past purchases such as providing coupons at the end receipts, however, this often does not account for higher margin products. Chances are a person will not purchase a plasma television on a regular basis, which means the retailer can very easily miss that opportunity to facilitate a purchase. The system predicts a customer's purchasing preferences not just on the customer's prior purchases but also their apparent interests, thus ensuring every potential purchase is effectively addressed.

Automated Customer Assistance at Shelf Module

The system can include an automated customer assistance at shelf module. A major reason why customers visit the brick-and-mortar is for the person-to-person interaction that is available. Although the system of the present invention can act as a "virtual shopping assistant" to help get the customer what they want, sometimes it is just better to talk with a real person. That is why the system also acts as an assistant to the sales associates to help better connect with the customers on a personal basis.

If at any time the customer feels that he or she would be better served by an actual sales associate, the customer can simply click the "help" button on an information monitoring device to alert a nearby employee. This however, is not simply a call for help. The system of the present invention takes all the information that has been captured in the customer's interactions and delivers it in an easy-to-understand format to the sales associate so the sales associate can better serve the customer. This ensures that the sales associate can be better prepared to successfully answer any questions or concerns of the customer about a potential purchase.

Fundamentally, the system of the present invention provides a profile of the customer to the sales associate. This informs the employee as to characteristics (such as demographics and what products the customer is interested in). In addition to this, the system can provide a brief summary of what the employee should be knowledgeable of (product specs, frequently asked questions etc.).

Some customers of course may not be as inclined to ask for help. This is why the system also can have the capability of alerting a nearby associate automatically when a customer has spent a set amount of time in a certain department but has yet to make a decision. These moments are critical for retailers, and until the system of the present invention, the only way to make contact with a customer during a higher-involvement decision was to be out on the storeroom floor vigilantly looking for customers, which can take away from other tasks. The system of the present invention automatically picks up signs of high-involvement decisions and notifies employees with the same valuable information that is available with the "help" button, allowing the retailer to best assistant the customer with their purchasing process.

The notification of the sales associates is possible through a variety of ways ranging from text messaging to mobile apps for the retail associates to external devices (such as headsets) that can notify the sales associate to a customer in need of assistance.

For a text messaging method, an associate's phone or a store provided phone would be sent a short message. This message could include information such as the location of the customer asking for assistance, what products they have interacted with, the customer's demographic information, and a short blurb about the products. This blurb allows even an untrained sales associate to be more knowledgeable and credible for the customer.

For a mobile application (which the sales associate downloads and installs), additional product information can be provided. As some customers may walk away from the display, a picture of the customer needing assistance may be sent to the sales associate's mobile device to aid them in finding the customer throughout the store. The mobile application could include things such as mobile payment to allow the sales associate to complete the transaction with the customer after they have been alerted to help them, and also allows the sales associate to sell products that may not be in stock at the store, but fulfilled by either a distribution center, other store, or direct from the customer.

Purchase at Shelf Module

The system can include a purchase at shelf module. Another of the present systems great strengths is its flexibility. In this way, it can cater to how the customer wants to shop. Just like in the online environment, many customers prefer to buy their products via the digital interface. The system of the present invention allows for this by tying its interface to a pre-existing payment processing system that many customers are already using on a regular basis (Ex: PayPal). Products can now be bought at shelf level with the option to ship directly to the customer or to pick-up in store. This not only provides flexibility to the customer but also employs the "endless aisle," a major attraction of the online marketplace.

In this way, the brick-and-mortar therefore has the best of both worlds. Customers are able to see a full array of the store's offerings, complete with comprehensive product information so they can make the best decision. As for the retailer, this relieves the huge burden of stock-outs. "Not-in-stock" is no longer a deal breaker because the customer can view the product and purchase it via the digital interface and have it shipped to their doorstep. Although this may seems like a deterrent because the advantage of the brick-and-mortar is the take-it-home feature. However, customers are already doing this by engaging in show rooming, and in this case they have the ease of returning it to the store if they do bit like the product or wish to return it for some other reasons.

In addition, the system's purchase at shelf capability also capitalizes on the impulse buy. After a customer decides on a purchase, the goal of the retailer is to help finalize that buy in the most time efficient manner. The system of the present invention expedites the traditional practices of retail in an effort to secure as soon as the customer makes a decision.

The cost of carrying inventory is very expensive. Additionally, one primary reason consumers shop online is due to the product selection that online retailers have versus their brick-and-mortar counterparts. The present system, through its methods and transaction integration, allows the retailer to hold less inventory of a specific product, and potentially a wider range of products. By allowing those customers who do not need their products today to purchase at the shelf and have these products delivered to their home within a few days, brick-and-mortar retailers can win against online sales by providing exactly what the customer wants at a lower cost to the physical retailer.

Reporting Module

The system can include a reporting module. Unparalleled business intelligence is one of the present system's main offerings to the brick-and-mortar. By doing so, the present system equips retailers with a competitive advantage over the online marketplace and other retailers. This information is delivered in the form of web-based reports, which retailers can easily use to visualize all of the data captured by the information monitoring devices. These reports are varied as well, created with the intent to better inform the retailer about its customer basis. Pre-defined reports are automatically generated to help the retailer understand traffic patterns and customer behavior. It can provide product description attention breakdown reports to determine the best messaging for each product. These breakdown reports can be applied any number of topics including product demographic attention to determine best product interest per demographic group. By tracking in-store traffic, the present system can identify most popular shopping times for certain products.

Figure 12:
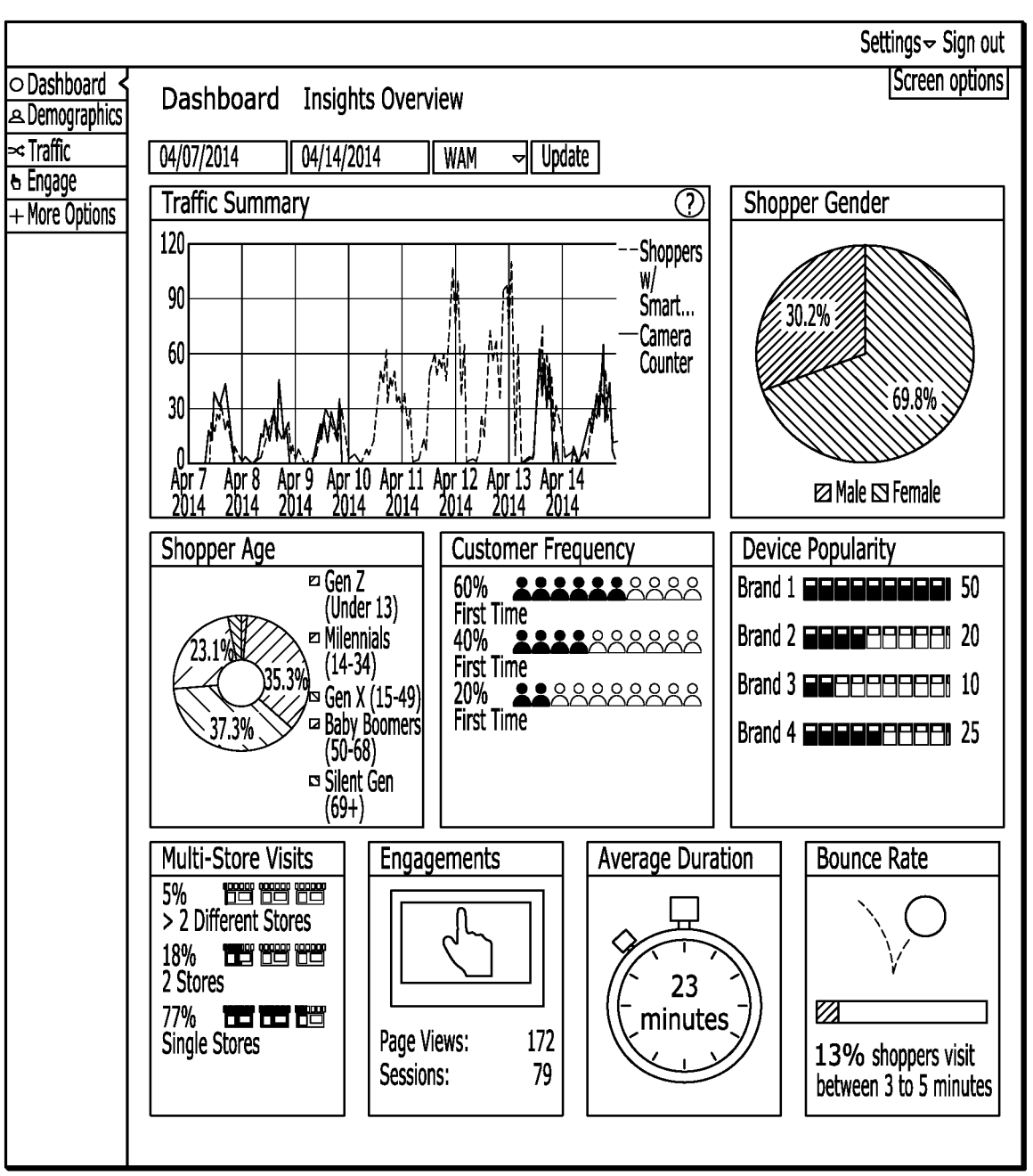
FIG. 12 illustrates a sample retailer dashboard report.

Demographic information, traffic, and heat mapping can all be achieved at a shelf level, adding another level of depth to the retailer's business intelligence. Retailers can ascertain what products drive their most loyal customers to purchase, what are the most popular and least popular products, and the "hot" and "cold" locations within the store. This presents the opportunity for multi-dimensional data comparison across data range, regions within the store, and against different data points. Although the system of the present invention can perform complex and intricate comparisons and reports, the system is set up on an intuitive interface to be easily accessible and understandable for the retailer. Reports can contain an export link for the user to get the concise dataset in order to generate these reports in Excel. FIG. 12 illustrates a sample report.

Application Programming Interface (API) Module

The system can include an application programming interface (API) module. Role based authentication token provide access to one or more datasets. This allows retailers to have real-time access to collected data. A representational state transfer (REST) web services get requests that takes multiple parameters and allows paging for effective data transfer. Possible parameters can include data range, location_id, store_id, product_id, gender, and age range. This allows retailers to create their own visualizations of the data for customizable use. In addition, it allows retailers to join datasets generated from the system of the present invention with internal private datasets for more in-depth detail analysis. This way, retailers can come to their own conclusions using data sets they have not had access to previously.

Advertising Broker Rules Engine Module

The system can include an advertising broker rules engine module. The system of the present invention provides a platform where marketing and advertising messages can be purchased and implemented at different price points based on customer demographics and previous interests. At the instance where the customer walks by, the engine calculates the highest value promotion based on a number of factors including but not limited to gender, age, sentiment, previous shopping history for the current visit, previous shopping history during other visits and closeness to the marketing device. Each impression will have a set minimal duration set by the system administrator to ensure the message is delivered. Manufacturers/merchandizers and retailers need to provide a maximum value per impression and total amount allocated for each promotion. If target is not met, a generic message will be displayed.

Relevance Rating Engine Module

The system can include a relevance rating engine module. The system of the present invention provides the capability to capture message relevance to a person's age and gender by actively engaging the customer via one or more questions. The customer can provide feedback using the touch screen during the customer's engagement. When the customer provides the feedback, the system captures the customer's demographic and associates the demographic based feedback to the presented message. Based on the relevance rating, the engine will increase or decrease the likelihood of this message shown to the same demographic range. An example of this capability can be used when a customer reads a particular review and rates the relevance at the time of engagement.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. A method for personalized marketing one or more products for purchase by a plurality of persons from retail stores, wherein, for each person in the plurality of persons, the method comprising (a) obtaining an information analysis about the shopping activities of the person, wherein, (i) the information analysis is an analysis of gathered information by one or more first information monitoring devices of a first system about shopping activities of the person, wherein (A) the first system comprises the one or more first information monitoring devices operably connected to (A) a first server, (B), one or more first databases, or (C) both, and (B) the person is in proximity of at least one of the one or more first information monitoring devices, and (ii) the gathered information comprises gathered product interaction information of the person, wherein (A) the gathered product interaction information comprises product interaction information gathered by at least one of the one or more first information monitoring devices, and (B) the product interaction information is based upon shopping by the person of one or more first products, (b) tracking the person using one or more second information monitoring devices of a second system to determine the person is located at a retail store that sells a product that relates to the one or more first products, wherein (A) the second system comprises the one or more second information monitoring devices operably connected to (A) a second server, (B), one or more second databases, or (C) both, and (B) the person is in proximity of at least one of the one or more second information monitoring devices;

(c) based upon the person being determined to be at the retail store, providing the person while at the retail store with a communication generated in real time by the second system of the retail store, wherein (i) the communication comprises a product communication that is directed to the person based upon the information analysis, (ii) the product communication regards a purchase option for the product, and (iii) the purchase option comprises an option to purchase the product at a reduced price during a limited period of time.

2. The method of claim 1, wherein the person is provided the communication via a first interactive device.

3. The method of claim 2, wherein the first interactive device is a cell phone of the person.

4. The method of claim 1, wherein the product communication comprises a coupon regarding the product, wherein the coupon is received by the person either as a printed out coupon or as a digital coupon.

5. The method of claim 1, wherein the communication is provided by a sales associate at the retail store.

6. The method of claim 5 further comprising:

(a) selecting the sales associate from a group of sales associates utilizing the information analysis, and (b) providing a sales associate communication to the sales associate about the person.

7. The method of claim 6, wherein the sales associate communication provides the sales associate information regarding the person, the product, and the reduced price.

8. The method of claim 1, wherein the one or more first information monitoring devices are selected from a group consisting of computing devices, user input and output devices, displays, POS devices, cameras, sensors; WIFI devices; in-store customer devices; output devices; system for communicating to user devices, and kiosks.

9. The method of claim 1, wherein the one or more first information monitoring devices are located with the retail store.

10. The method of claim 1, wherein the step of tracking the person comprises tracking a mobile device being carried by the person.

11. The method of claim 1, wherein the gathered information further comprises current price information of the product, wherein the current price information of the product comprises (a) current retail store price of the product by the retail store and (v) current other seller price of the product by at least one other sellers.

12. The method of claim 11, wherein the reduced price is at a price that is (a) less than the current retail store price and (b) at most the current other seller price.

13. The method of claim 11, wherein the product communication communicates to the person that current retail store price, the current other seller price, and the reduced price.

14. The method of claim 13, wherein the person is provided the communication via a first interactive device.

15. The method of claim 14, wherein the first interactive device is a cell phone of the person.

16. The method of claim 13, wherein the product communication comprises a coupon regarding the product, wherein the coupon is received by the person either as a printed out coupon or as a digital coupon.

17. The method of claim 13, wherein the communication is provided by a sales associate at the retail store.

18. The method of claim 17 further comprising:
  (a) selecting the sales associate from a group of sales associates utilizing the information analysis, and
  (b) providing a sales associate communication to the sales associate about the person.

19. The method of claim 17, wherein the sales associate communication provides the sales associate information regarding the person, the product, and the reduced price.

20. The method of claim 13, wherein the one or more first information monitoring devices are located with the retail store.

\* \* \* \* \*